US012367694B2

(12) United States Patent
Kang et al.

(10) Patent No.: US 12,367,694 B2
(45) Date of Patent: Jul. 22, 2025

(54) METHODS AND SYSTEMS FOR SEMANTICALLY SEGMENTING A SOURCE TEXT IMAGE BASED ON A TEXT AREA THRESHOLD DETERMINATION

(71) Applicant: Samsung Electronics Co., Ltd., Suwon-si (KR)

(72) Inventors: Andrea D. Kang, San Diego, CA (US); Jinhong Wu, San Diego, CA (US); Mostafa El-Khamy, San Diego, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 581 days.

(21) Appl. No.: 17/656,037

(22) Filed: Mar. 23, 2022

(65) Prior Publication Data

US 2023/0139004 A1 May 4, 2023

Related U.S. Application Data

(60) Provisional application No. 63/273,289, filed on Oct. 29, 2021.

(51) Int. Cl.
*G06V 30/148* (2022.01)
*G06V 10/34* (2022.01)
*G06V 30/162* (2022.01)
*G06V 30/18* (2022.01)

(52) U.S. Cl.
CPC .............. *G06V 30/15* (2022.01); *G06V 10/34* (2022.01); *G06V 30/162* (2022.01); *G06V 30/1801* (2022.01)

(58) Field of Classification Search
CPC ...... G06V 30/148–158; G06V 30/1801; G06V 30/162; G06V 10/34
See application file for complete search history.

(56) References Cited

U.S. PATENT DOCUMENTS 4,887,301 A * 12/1989 Hodgens .............. G06V 30/148
                                                              382/178
5,181,255 A    1/1993 Bloomberg
5,267,326 A * 11/1993 Rao ....................... G06V 30/15
                                                              382/179

(Continued)

FOREIGN PATENT DOCUMENTS

CN    112036420 A    12/2020
KR    102026280 B1   11/2019

OTHER PUBLICATIONS

Ha et al ,Recursive XY Cut Using Bounding boxes of connected components, Proceedings of the International Conference on Document Analysis and Recognition 1995 (Year: 1999).*

*Primary Examiner* — Sean T Motsinger
(74) *Attorney, Agent, or Firm* — Myers Bigel, P.A.

(57) ABSTRACT

A method includes receiving a binary annotation of source text; performing a close operation on the binary annotation to generate a closed annotation using an initial kernel size; defining one or more contours in the closed annotation using one or more bounding boxes, respectively; determining a subset of the one or more contours for which a percentage of area occupied by text within a corresponding bounding box exceeds a threshold; and generating a final annotation of the source text based on the subset of the one or more contours.

17 Claims, 24 Drawing Sheets

(56) References Cited

U.S. PATENT DOCUMENTS

| | | | | |
|---|---|---|---|---|
| 5,384,864 | A * | 1/1995 | Spitz | G06V 30/158 |
| | | | | 382/177 |
| 5,513,304 | A * | 4/1996 | Spitz | G06V 30/158 |
| | | | | 715/268 |
| 8,768,057 | B2 | 7/2014 | Saund | |
| 2011/0007366 | A1* | 1/2011 | Sarkar | G06V 30/15 |
| | | | | 382/177 |
| 2013/0108159 | A1* | 5/2013 | Abdulkader | G06V 30/148 |
| | | | | 382/177 |
| 2013/0191715 | A1* | 7/2013 | Raskovic | G06V 30/414 |
| | | | | 715/227 |
| 2014/0037181 | A1* | 2/2014 | Koo | G06V 30/224 |
| | | | | 382/182 |
| 2015/0063699 | A1* | 3/2015 | Wu | G06V 30/15 |
| | | | | 382/176 |
| 2018/0018774 | A1* | 1/2018 | Kacher | G06T 3/067 |
| 2019/0294641 | A1* | 9/2019 | Alexeev | G06V 10/82 |
| 2020/0302168 | A1 | 9/2020 | Vo et al. | |
| 2021/0056429 | A1 | 2/2021 | Gangeh et al. | |
| 2021/0124971 | A1* | 4/2021 | Corfield | G06F 3/0482 |
| 2021/0256253 | A1* | 8/2021 | Chen | G06F 40/106 |
| 2021/0334528 | A1* | 10/2021 | Bray | G06F 18/21 |
| 2021/0383109 | A1* | 12/2021 | Mukherji | G06F 18/217 |
| 2022/0309639 | A1* | 9/2022 | Liu | G06V 10/54 |
| 2023/0017915 | A1* | 1/2023 | Mukherji | G06F 18/217 |
| 2023/0139004 | A1* | 5/2023 | Kang | G06V 30/15 |
| | | | | 382/177 |
| 2023/0139831 | A1* | 5/2023 | Wang | G06V 30/1444 |
| | | | | 704/9 |
| 2023/0186663 | A1* | 6/2023 | Yoshimura | G06V 30/1908 |
| | | | | 382/182 |

* cited by examiner

| 1234 | Title Text | | | |
|---|---|---|---|---|
| Column 1 | Column 2 | Column 3 | Column 4 | |
| Lorem ipsum dolor sit amet, consectetur adipiscing elit. In nec orci volutpat, | ex tristique, consequat magna. Pellentesque habitant morbi tristique senectus et Quisque pretium consequat | imperdiet tempor convallis. Nulla facilisi. Quisque pretium consequat | Lorem ipsum | |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna eu ante. Suspendisse et | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Rhoncus, lorem | |
| Lorem ipsum dolor sit amet, consectetur adipiscing elit. In nec orci volutpat, | nibh consectetur velit, eu condimentum tortor urna In nec orci volutpat, | | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Lorem ipsum | |
| Pellentesque habitant morbi tristique senectus et Quisque pretium consequat | Lorem ipsum dolor sit amet, consectetur adipiscing elit. In nec orci volutpat, Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat, | Lorem ipsum Rhoncus, lorem | |

FIG. 5A

| 1234 | Title Text | | | |
|---|---|---|---|---|
| Column 1 | Column 2 | Column 3 | Column 4 | |
| Lorem ipsum dolor sit amet, consectetur adipiscing elit. In nec orci volutpat, | ex tristique, consequat magna. Pellentesque habitant morbi tristique senectus et Quisque pretium consequat | imperdiet tempor convallis. Nulla facilisi. Quisque pretium consequat | Lorem ipsum | |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna eu ante. Suspendisse et | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Rhoncus, lorem | |
| Lorem ipsum dolor sit amet, consectetur adipiscing elit. In nec orci volutpat, | nibh consectetur velit, eu condimentum tortor urna In nec orci volutpat, | | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Lorem ipsum | |
| Pellentesque habitant morbi tristique senectus et Quisque pretium consequat | Lorem ipsum dolor sit amet, consectetur adipiscing elit. In nec orci volutpat, Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat, | Lorem ipsum Rhoncus, lorem | |

FIG. 5B

| 1234 | Text | | |
|---|---|---|---|
| Column 1 | Column 2 | Column 3 | Column 4 |
| Lorem ipsum dolor sit amet, consectetur adipiscing elit. In nec orci volutpat, | ex tristique, consequat magna. Pellentesque habitant morbi tristique senectus et Quisque pretium consequat | imperdiet tempor convallis. Nulla facilisi. Quisque pretium consequat | Lorem ipsum |

| 1234 | Title Text | | | |
|---|---|---|---|---|
| Column 1 | Column 2 | Column 3 | Column 4 | |
| Lorem ipsum dolor sit amet, consectetur adipiscing elit. In nec orci volutpat, | ex tristique, consequat magna. Pellentesque habitant morbi tristique senectus et Quisque pretium consequat | imperdiet tempor convallis. Nulla facilisi. Quisque pretium consequat | Lorem ipsum | |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna eu ante. Suspendisse et | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Rhoncus, lorem | |
| Lorem ipsum dolor sit amet, consectetur adipiscing elit. In nec orci volutpat, | nibh consectetur velit, eu condimentum tortor urna In nec orci volutpat, | | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Lorem ipsum | |
| Pellentesque habitant morbi tristique senectus et Quisque pretium consequat | Lorem ipsum dolor sit amet, consectetur adipiscing elit. In nec orci volutpat, Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat, | Lorem ipsum Rhoncus, lorem | |

FIG. 13A

| 1234 | | Title Text | | |
|---|---|---|---|---|
| Column 1 | Column 2 | Column 3 | Column 4 | |
| Lorem ipsum dolor sit amet, consectetur adipiscing elit. In nec orci volutpat, | ex tristique, consequat magna, Pellentesque habitant morbi tristique senectus et Quisque pretium consequat | imperdiet tempor convallis. Nulla facilisi. Quisque pretium consequat | Lorem ipsum | |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna eu ante. Suspendisse et | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Rhoncus, lorem | |
| Lorem ipsum dolor sit amet, consectetur adipiscing elit. In nec orci volutpat, | nibh consectetur velit, eu condimentum tortor urna In nec orci volutpat, | | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Lorem ipsum | |
| Pellentesque habitant morbi tristique senectus et Quisque pretium consequat | Lorem ipsum dolor sit amet, consectetur adipiscing elit. In nec orci volutpat, Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat, | Lorem ipsum Rhoncus, lorem | |

FIG. 13B

| 1234 | Title Text | | |
|---|---|---|---|
| Column 1 | Column 2 | Column 3 | Column 4 |
| Lorem ipsum dolor sit amet, consectetur adipiscing elit. In nec orci volutpat, | ex tristique, consequat magna. Pellentesque habitant morbi tristique senectus et Quisque pretium consequat | imperdiet tempor convallis. Nulla facilisi. Quisque pretium consequat | Lorem ipsum |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna eu ante. Suspendisse et | |
| Pellentesque habitant morbi tristique senectus et Quisque pretium consequat  Lorem ipsum dolor sit amet, consectetur adipiscing elit. In nec orci volutpat, | Lorem ipsum dolor sit amet, consectetur adipiscing elit. In nec orci volutpat,  nibh consectetur velit, eu condimentum tortor urna In nec orci volutpat, | Lorem ipsum dolor sit amet, consectetur adipiscing elit. In nec orci volutpat, | Rhoncus, lorem |
| Pellentesque habitant morbi tristique senectus et Quisque pretium consequat  Pellentesque habitant morbi tristique senectus et Quisque pretium consequat | Lorem ipsum dolor sit amet, consectetur adipiscing elit. In nec orci volutpat,  Lorem ipsum dolor sit amet, consectetur adipiscing elit. In nec orci volutpat, Pellentesque habitant morbi tristique senectus et Quisque pretium consequat | Lorem ipsum dolor sit amet, consectetur adipiscing elit. In nec orci volutpat,  Pellentesque habitant morbi tristique senectus et Quisque pretium consequat Lorem ipsum dolor sit amet, consectetur adipiscing elit. In nec orci volutpat, | Lorem ipsum  Lorem ipsum  Rhoncus, lorem |

FIG. 13C

| 1234 | | | Title Text |
|---|---|---|---|
| Column 1 | Column 2 | Column 3 | Column 4 |
| Lorem ipsum dolor sit amet, consectetur adipiscing elit. In nec orci volutpat, | ex tristique, consequat magna. Pellentesque habitant morbi tristique senectus et Quisque pretium consequat | imperdiet tempor convallis. Nulla facilisi. Quisque pretium consequat | Lorem ipsum |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna eu ante. Suspendisse et | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Rhoncus, lorem |
| Lorem ipsum dolor sit amet, consectetur adipiscing elit. In nec orci volutpat, | nibh consectetur velit, eu condimentum tortor urna In nec orci volutpat, | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Lorem ipsum |
| Pellentesque habitant morbi tristique senectus et Quisque pretium consequat | Lorem ipsum dolor sit amet, consectetur adipiscing elit. In nec orci volutpat, Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat, | Lorem ipsum Rhoncus, lorem |

FIG. 13D

| 1234 | | Title Text | | |
|---|---|---|---|---|
| Column 1 | Column 2 | Column 3 | Column 4 | |
| Lorem ipsum dolor sit amet, consectetur adipiscing elit. In nec orci volutpat, | ex tristique, consequat magna. Pellentesque habitant morbi tristique senectus et Quisque pretium consequat | imperdiet tempor convallis. Nulla facilisi. Quisque pretium consequat | Lorem ipsum | |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna eu ante. Suspendisse et | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Rhoncus, lorem | |
| Lorem ipsum dolor sit amet, consectetur adipiscing elit. In nec orci volutpat, | nibh consectetur velit, eu condimentum tortor urna In nec orci volutpat, | | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | Lorem ipsum | |
| Pellentesque habitant morbi tristique senectus et Quisque pretium consequat | Lorem ipsum dolor sit amet, consectetur adipiscing elit. In nec orci volutpat, Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat, | Lorem ipsum Rhoncus, lorem | |

FIG. 13E

| 1234 | | Title Text | | |
|---|---|---|---|---|
| Column 1 | Column 2 | Column 3 | | Column 4 |
| Lorem ipsum dolor sit amet, consectetur adipiscing elit. In nec orci volutpat, | ex tristique, consequat magna, Pellentesque habitant morbi tristique senectus et Quisque pretium consequat | imperdiet tempor convallis. Nulla facilisi. | | Lorem ipsum |
| | | Quisque pretium consequat | | |
| Pellentesque habitant morbi tristique senectus et Quisque pretium consequat adipiscing elit | Lorem ipsum dolor sit amet, consectetur adipiscing elit. In nec orci volutpat, | nibh consectetur velit, eu condimentum tortor urna | | |
| | | eu ante. Suspendisse et | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | | Rhoncus, lorem |
| Lorem ipsum dolor sit amet, consectetur adipiscing elit. In nec orci volutpat, | nibh consectetur velit, eu condimentum tortor urna In nec orci volutpat, | | | |
| Pellentesque habitant morbi tristique senectus et Quisque pretium consequat | Lorem ipsum dolor sit amet, consectetur adipiscing elit. In nec orci volutpat, | Lorem ipsum dolor sit amet, consectetur adipiscing elit. In nec orci volutpat, | | Lorem ipsum |
| Pellentesque habitant morbi tristique senectus et Quisque pretium consequat | Lorem ipsum dolor sit amet, consectetur adipiscing elit. In nec orci volutpat, Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat, | | Lorem ipsum |
| | | | | Rhoncus, lorem |

| | 1234 | | Title Text | | |
|---|---|---|---|---|---|
| | Column 1 | Column 2 | Column 3 | Column 4 | |
| | Lorem ipsum dolor sit amet, consectetur adipiscing elit. In nec orci volutpat. | ex tristique, consequat magna. Pellentesque habitant morbi tristique senectus et Quisque pretium consequat | imperdiet tempor convallis. Nulla facilisi. Quisque pretium consequat | Lorem ipsum | |
| | Pellentesque habitant morbi tristique senectus et Quisque pretium consequat adipiscing elit | Lorem ipsum dolor sit amet, consectetur adipiscing elit. In nec orci volutpat. | nibh consectetur velit, eu condimentum tortor urna eu ante. Suspendisse et | | |
| | Pellentesque habitant morbi tristique senectus et Quisque pretium consequat | Lorem ipsum dolor sit amet, consectetur adipiscing elit. In nec orci volutpat. | Lorem ipsum dolor sit amet, consectetur adipiscing elit. In nec orci volutpat. | Rhoncus, lorem | |
| | Lorem ipsum dolor sit amet, consectetur adipiscing elit. In nec orci volutpat. | nibh consectetur velit, eu condimentum tortor urna In nec orci volutpat. | | | |
| | Pellentesque habitant morbi tristique senectus et Quisque pretium consequat | Lorem ipsum dolor sit amet, consectetur adipiscing elit. In nec orci volutpat. | Lorem ipsum dolor sit amet, consectetur adipiscing elit. In nec orci volutpat. | Lorem ipsum | |
| | Pellentesque habitant morbi tristique senectus et Quisque pretium consequat | Lorem ipsum dolor sit amet, consectetur adipiscing elit. In nec orci volutpat. Pellentesque habitant morbi tristique senectus et Quisque pretium consequat | Pellentesque habitant morbi tristique senectus et Quisque pretium consequat Lorem ipsum dolor sit amet, consectetur adipiscing elit. In nec orci volutpat. | Lorem ipsum Rhoncus, lorem | |

FIG. 14C

METHODS AND SYSTEMS FOR SEMANTICALLY SEGMENTING A SOURCE TEXT IMAGE BASED ON A TEXT AREA THRESHOLD DETERMINATION

RELATED APPLICATION

The present application claims priority from and the benefit of U.S. Provisional Application No. 63/273,289, filed Oct. 29, 2021, the disclosure of which is hereby incorporated herein by reference in its entirety.

FIELD

The present inventive concepts relate generally to artificial intelligence systems and, more particularly, to the use of semantic text segmentation in artificial intelligence systems.

BACKGROUND

Text segmentation is the process of dividing written text into meaningful units, such as words, sentences, or topics. In long text documents, such as news articles and magazine articles, multiple topics are often discussed, and there are few, if any, headers. The ability to segment documents based on topic may enable users to access and analyze the sub-topics in a document, rather than the document in its entirety. The use of these topically segmented documents has applications in retrieval of relevant meaningful portions of data and improving retrieval accuracy of the data. Semantic segmentation, however, can be challenging because text can be written in many ways including using different languages, different fonts, different arrangements (e.g., columns, tables, etc.), and the like. Moreover, some artificial intelligence systems annotate text differently—some by character, others by word. Existing systems typically annotate text using a dedicated network or system for text detection and/or recognition. These networks or systems generally focus on groups of text or word/character annotations.

SUMMARY

According to some embodiments of the inventive concept, a method comprises: receiving a binary annotation of source text; performing a close operation on the binary annotation to generate a closed annotation using an initial kernel size; defining one or more contours in the closed annotation using one or more bounding boxes, respectively; determining a subset of the one or more contours for which a percentage of area occupied by text within a corresponding bounding box exceeds a threshold; and generating a final annotation of the source text based on the subset of the one or more contours.

In other embodiments, receiving the binary annotation of source text comprises: receiving an original annotation of source text; and converting the original annotation of source text to the binary annotation of source text.

In still other embodiments, the method further comprises: performing operations of performing the close operation, defining the one or more contours, and determining the subset of the one or more contours in iterative fashion for respective ones of the subset of the one or more contours until all of the one or more contours are included in the subset of the one or more contours.

In still other embodiments, the method further comprises: reducing the initial kernel size with each successive iteration.

In still other embodiments, the method further comprises: determining, for respective ones of the subset of the one or more contours, a percentage of area occupied by text within the corresponding bounding box as applied to the binary annotation to generate a plurality of original text percentages; merging the subset of the one or more contours into a merged annotation; determining, for respective ones of the subset of the one or more contours, a percentage of area occupied by text within the corresponding bounding box as applied to the merged annotation to generate a plurality of merged text percentages; dilating the merged annotation to generate a dilated merged annotation; and determining, for respective ones of the subset of the one or more contours, a percentage of area occupied by text within the corresponding bounding box as applied to the dilated merged annotation to generate a plurality of dilated merged text percentages.

In still other embodiments, the threshold is a first threshold; and generating the final annotation comprises: generating the final annotation using respective ones of the subset of the one or more contours as applied to the dilated merged annotation when the corresponding merged text percentage is greater than the corresponding original text percentage by a second threshold and the corresponding dilated merged text percentage is greater than the corresponding merged text percentage by a third threshold; and generating the final annotation using respective ones of the subset of the one or more contours as applied to the merged annotation when the corresponding merged text percentage is not greater than the corresponding original text percentage by the second threshold or the corresponding dilated merged text percentage is not greater than the corresponding merged text percentage by the third threshold.

In still other embodiments, generating the final annotation further comprises: dividing the final annotation along a first line extending in a first direction or along a second line extending in a second direction that is perpendicular to the first direction to create a first portion and a second portion; defining a first contour using a first rectangular bounding box for text within the first portion and a second contour using a second rectangular bounding box for text within the second portion; determining, for each of the first contour and the second contour, whether a percentage of area occupied by text within the corresponding first or second rectangular bounding box exceeds a fourth threshold, the subset of the one or more contours comprising respective ones of the first contour and the second contour having the percentage of area occupied by text within the corresponding bounding box exceeding the fourth threshold.

In still other embodiments, performing the close operation comprises: performing a dilation on the binary annotation to generate a dilated binary annotation; and performing an erosion on the dilated binary annotation to generate the closed annotation.

In still other embodiments, defining the one or more contours in the closed annotation using one or more bounding boxes, respectively, comprises: dividing the closed annotation into text groupings based on distances between adjacent ones of the text groupings; wherein the text groupings correspond to the one or more contours.

In some embodiments of the inventive concept, a method comprises: receiving a binary annotation of source text; dividing the binary annotation along a first line extending in a first direction or along a second line extending in a second direction that is perpendicular to the first direction to create a first portion and a second portion; defining a first contour using a first bounding box for text within the first portion and a second contour using a second bounding box for text within the second portion; determining a subset of the first contour and the second contour for which a percentage area occupied by text within the first or second bounding box exceeds a threshold; and generating a final annotation of the source text based on the subset of the first contour and the second contour.

In further embodiments, dividing the binary annotation comprises: dividing the binary annotation into a first text grouping and a second text grouping based on a distance in the first direction or the second direction between the first text grouping and the second text grouping; wherein the first text grouping and the second text grouping respectively correspond to the first contour and the second contour.

In still further embodiments, dividing the binary annotation into the first text grouping and the second text grouping comprises: dividing the binary annotation into the first text grouping and the second text grouping when the distance in the first direction or the second direction between the first text grouping and the second text grouping exceeds a distance threshold.

In still further embodiments, the method further comprises: performing operations of dividing the binary annotation, defining the first contour and the second contour, and determining the subset of the first contour and the second contour, in iterative fashion for respective ones of the first contour and the second contour for which the percentage of area occupied by text within the corresponding bounding box does not exceed the threshold until all of the first contour and the second contour are determined to be in the subset of the first contour and the second contour or are determined to not have the first text grouping and the second text grouping therewithin that exceeds the distance threshold.

In still further embodiments, generating the final annotation comprises: generating the final annotation using respective ones of the subset of the first contour and the second contour and respective ones of the first contour and second contour for which the distance between the first text grouping and the second text grouping therewithin does not exceed the distance threshold.

In some embodiments of the inventive concept, a system comprises a processor; and a memory coupled to the processor and comprising computer readable program code embodied in the memory that is executable by the processor to perform operations comprising: receiving a binary annotation of source text; performing a close operation on the binary annotation to generate a closed annotation using an initial kernel size; defining one or more contours in the closed annotation using one or more bounding boxes, respectively; determining a subset of the one or more contours for which a percentage of area occupied by text within a corresponding bounding box exceeds a threshold; and generating a final annotation of the source text based on the subset of the one or more contours.

In other embodiments, the operations further comprise: performing operations of performing the close operation, defining the one or more contours, and determining the subset of the one or more contours in iterative fashion for respective ones of the subset of the one or more contours until all of the one or more contours are included in the subset of the one or more contours.

In still other embodiments, the operations further comprise: reducing the initial kernel size with each successive iteration.

In still other embodiments, the operations further comprise: determining, for respective ones of the subset of the one or more contours, a percentage of area occupied by text within the corresponding bounding box as applied to the binary annotation to generate a plurality of original text percentages; merging the subset of the one or more contours into a merged annotation; determining, for respective ones of the subset of the one or more contours, a percentage of area occupied by text within the corresponding bounding box as applied to the merged annotation to generate a plurality of merged text percentages; dilating the merged annotation to generate a dilated merged annotation; and determining, for respective ones of the subset of the one or more contours, a percentage of area occupied by text within the corresponding bounding box as applied to the dilated merged annotation to generate a plurality of dilated merged text percentages.

In still other embodiments, the threshold is a first threshold; and generating the final annotation comprises: generating the final annotation using respective ones of the subset of the one or more contours as applied to the dilated merged annotation when the corresponding merged text percentage is greater than the corresponding original text percentage by a second threshold and the corresponding dilated merged text percentage is greater than the corresponding merged text percentage by a third threshold; and generating the final annotation using respective ones of the subset of the one or more contours as applied to the merged annotation when the corresponding merged text percentage is not greater than the corresponding original text percentage by the second threshold or the corresponding dilated merged text percentage is not greater than the corresponding merged text percentage by the third threshold.

In still other embodiments, performing the close operation comprises: performing a dilation on the binary annotation to generate a dilated binary annotation; and performing an erosion on the dilated binary annotation to generate the closed annotation.

Other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which:

FIGS. 5A and 5B illustrate an original annotation of source text and a binary annotation of the source text, respectively, according to some embodiments of the inventive concept;

Figure 9A:
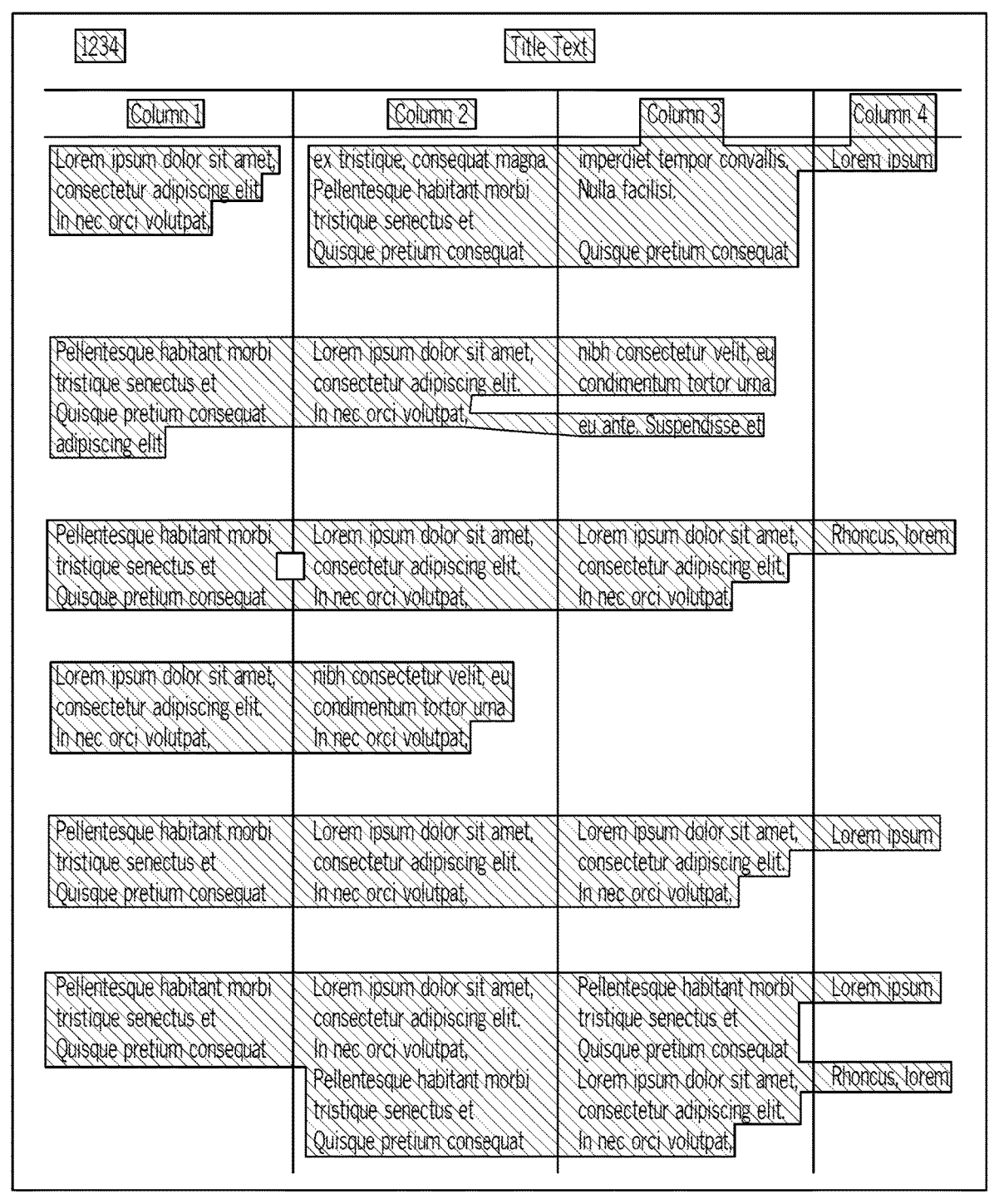
Figure 9B:
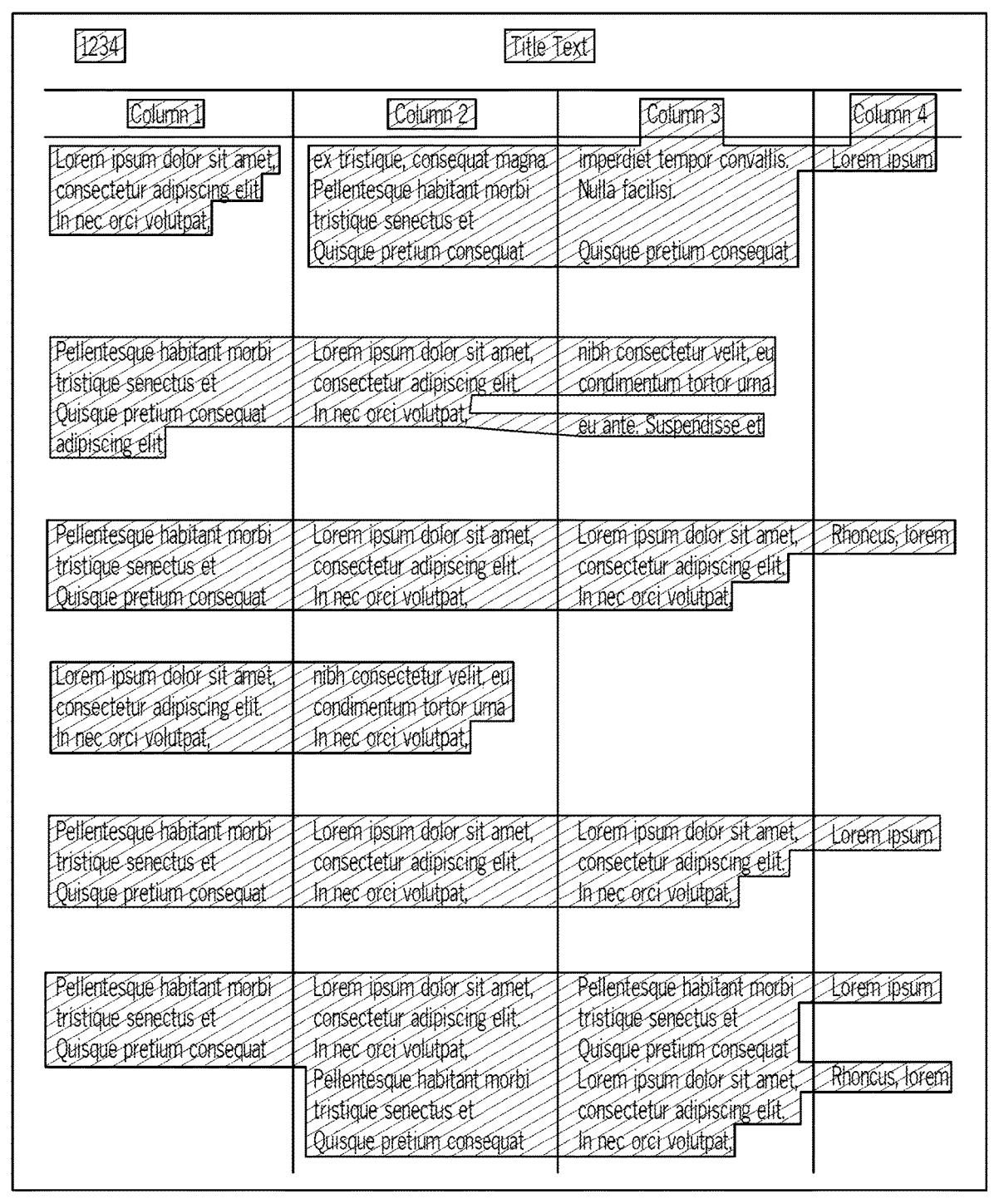

FIGS. 9A and 9B illustrate a merged annotation and a dilated merged annotation of the source text according to some embodiments of the inventive concept;

FIG. 11 illustrates a final annotation of the source text according to some embodiments of the inventive concept;

FIGS. 13A-13F illustrate annotations of source text through contours that correspond to rectangular boxes that are generated by subdividing or bisecting the source text into two portions along a first direction or second direction, which are perpendicular to each other, according to some embodiments of the inventive concept;

FIGS. 14A-14C illustrate annotations of source text using the operations of FIGS. 4 and 12 according to some embodiments of the inventive concept;

DETAILED DESCRIPTION

Figure 1:
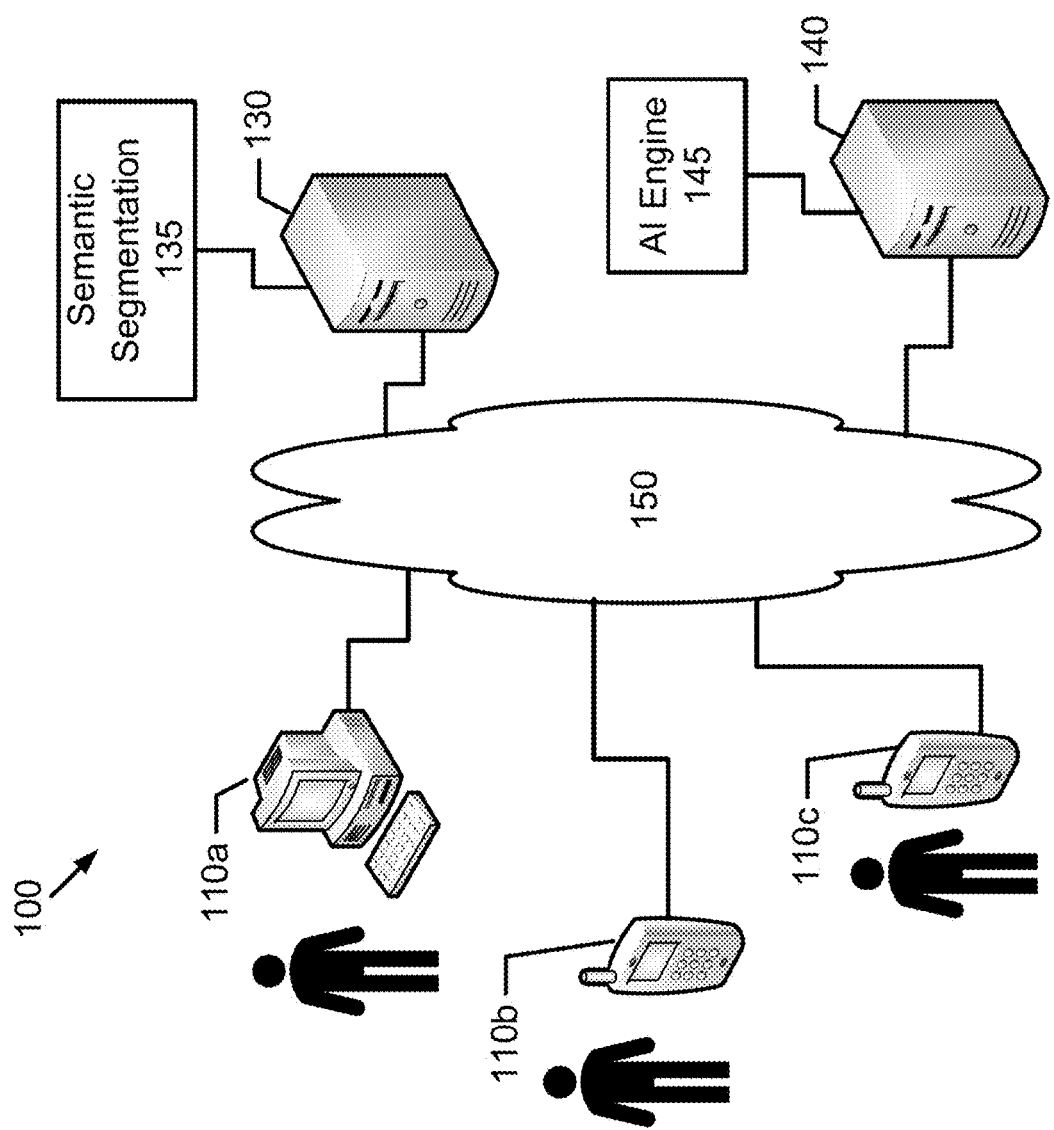
FIG. 1 is a block diagram that illustrates a communication network including a semantic text segmentation system in accordance with some embodiments of the inventive concept.

In the following detailed description, numerous specific details are set forth to provide a thorough understanding of embodiments of the present inventive concept. However, it will be understood by those skilled in the art that the present invention may be practiced without these specific details. In some instances, well-known methods, procedures, components, and circuits have not been described in detail so as not to obscure the present inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the inventive concept are described herein in the context of an artificial intelligence engine comprising a multi-layer neural network. It will be understood that other types of artificial intelligence systems can be used in other embodiments of the artificial intelligence engine including, but not limited to, machine learning systems, deep learning systems, and/or computer vision systems. Moreover, it will be understood that the multi-layer neural network described herein is a multi-layer artificial neural network comprising artificial neurons or nodes and does not include a biological neural network comprising real biological neurons.

Labeling or annotation refers to the operations of evaluating data points and providing a truth for an artificial intelligence system to learn from. If there are only two available classes, the labeling or annotation may be called binary labeling or binary annotation. For example, embodiments of the inventive concept are described herein in the context of a binary annotation to distinguish between text and not-text.

Some embodiments of the inventive concept stem from a realization that the many ways in which text can be written can complicate the semantic segmentation process and that existing artificial intelligence (AI) systems often use a dedicated network or system to perform semantic segmentation, which are generally designed to annotate groups of text or word/character combinations. Some embodiments of the inventive concept may provide text segmentation systems and methods that are based on annotating the source text image through contours corresponding to natural text groupings or annotations that are evaluated based on whether the text within a particular contour satisfies a surface area ratio test. Specifically, if the percentage of text within a contour (i.e., the ratio of area devoted to text to the total area within the contour) exceeds a defined threshold, then the contour may be used in a final annotation of the source text image. If the percentage of text within a contour fails to exceed the defined threshold, then the operations continue in iterative fashion by creating additional contours from the contour that failed the threshold test until the percentage of text within the new contours satisfy the defined threshold.

In some embodiments, the text segmentation may use a close operation, which includes a dilation (enlargement) operation in conjunction with an erosion (shrinking) operation to narrow gaps or holes between the text groupings or annotations that are associated with the contours. Once a set of final contours have been obtained that satisfy the text percentage threshold test (i.e., a subset of one or more contours for which a percentage of area occupied by text within the corresponding bounding box exceeds the threshold), these final contours may be merged to create a merged annotation. The creation of the merged annotation may result in holes or gaps. To reduce or eliminate these holes, the merged annotation may be dilated to generate a dilated merged annotation. Various surface area text percentages may be calculated including the percentage of area occupied by text when the final contours are applied to the original source text image to generate a plurality of original text percentages, the percentage of area occupied by text when the final contours are applied to the merged annotation to generate a plurality of merged text percentages, and the percentage of area occupied by text when the final contours are applied to the dilated merged annotation to generate a plurality of dilated merged text percentages. The final annotation for the source text image may be generated by using the final contours as applied to the dilated merged annotation when the corresponding merged text percentage is greater than the corresponding original text percentage by a second threshold and the corresponding dilated merged text percentage is greater than the corresponding merged text percentage by a third threshold. The final annotation for the source text image may be generated by using the final contours as applied to the merged annotation when the corresponding merged text percentage is not greater than the corresponding original text percentage by a second threshold or the corresponding dilated merged text percentage is not greater than the corresponding merged text percentage by a third threshold.

Some further embodiments of the inventive concept may provide text segmentation systems and methods that are based on annotating the source text image through contours that correspond to rectangular boxes that are generated by subdividing or bisecting the source text image into two portions along a first direction or second direction, which are perpendicular to each other. A similar text percentage threshold test is performed to determine if the ratio of surface area consumed by text to total surface area in each portion is greater than a defined threshold. If so, the contour or rectangular bounding box may be used as a final annotation for that portion. Otherwise, the process continues in iterative fashion similar to that described above by performing the same subdivision or bisecting operation on the portion that failed the threshold test to create two new portions. The process continues until all portions satisfy the text percentage threshold test or it is not possible to sub-divide a portion of the source text image any further.

In some embodiments of the inventive concept, the text segmentation based on bisecting the source text image along either of two perpendicular directions can be applied to the output annotation from the above-described embodiments to further annotate the text therewithin.

Thus, some embodiments of the inventive concept may provide text segmentation systems and methods that may include morphological operations, such as dilation, erosion, closing, and the like, that are integrated into the segmentation process. As a result, a separate system or network may not be necessary in grouping the various text annotations together in the final annotation of the original source text image. Moreover, the text segmentation systems and methods may facilitate the grouping of paragraphs or sections of text together in contrast to some text detection or recognition systems or networks that are designed to distinguish between different types of text, identify word/character annotations, or to identify image edges. The identification of paragraphs or sections in text images may facilitate the identification of classes of information, which may be useful as input to or in training of AI systems or models.

Referring to FIG. 1, a communication network 100 including a semantic text segmentation system in accordance with some embodiments of the inventive concept, comprises a segmentation server 130 including a semantic segmentation module 135 that is configured to execute thereon and an AI server 140 including an AI engine module 145 that is configured to execute thereon. The segmentation server 130 and the AI server 140 may be configured to receive one or more source text image files from users associated with devices 110a, 110b, and 110c. These source text image files may be binary annotations of an original text annotation or the segmentation server 130 and/or the AI server 140 may be configured to convert the original text annotation to a binary annotation. According to some embodiments of the inventive concept, the segmentation server 130 may be configured to annotate the source text image through contours corresponding to natural text groupings or annotations that are evaluated based on whether the text within a particular contour satisfies a surface area ratio test and/or annotate the source text image through contours that correspond to rectangular boxes that are generated by subdividing or bisecting the source text image into two portions along a first direction or second direction, which are perpendicular to each other. Such annotation may facilitate the grouping of paragraphs and/or sections of text together. Disjoint text annotations can be grouped with contours being generated that are either based on morphed boundaries from the original text and/or bounding boxes that satisfy a text surface area ratio threshold.

It will be understood that the division of functionality described herein between the AI server 140/AI engine module 145 and the segmentation server 130/semantic segmentation module 135 is an example. Various functionality and capabilities can be moved between the AI server 140/AI engine module 145 and the segmentation server 130/semantic segmentation module 135 in accordance with different embodiments of the inventive concept. Moreover, in some embodiments, the AI server 140/AI engine module 145 and the segmentation server 130/semantic segmentation module 135 may be merged as a single logical and/or physical entity.

A network 150 couples the devices 110a, 110b, and 110c to the segmentation server 130 and the AI server 140. The network 150 may be a global network, such as the Internet, Public Switched Telephone Network (PSTN), or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The service provided through the segmentation server 130/semantic segmentation module 135 for performing semantic text segmentation of a source text image file and/or the AI server 140/AI engine module 145 for performing classification, interpretation, and/or natural language processing of text may, in some embodiments, be embodied as a cloud service. For example, the users by way of devices 110a, 110b, and 110c may be configured to access the semantic text segmentation service and/or the AI services as Web services. In some embodiments, the semantic text segmentation service and/or the AI services may be implemented as Representational State Transfer Web Services (RESTful Web services).

Although FIG. 1 illustrates an example communication network including a semantic text segmentation system for segmenting text based on a text area threshold determination, it will be understood that embodiments of the inventive concept are not limited to such configurations, but are intended to encompass any configuration capable of carrying out the operations described herein.

Figure 2A:
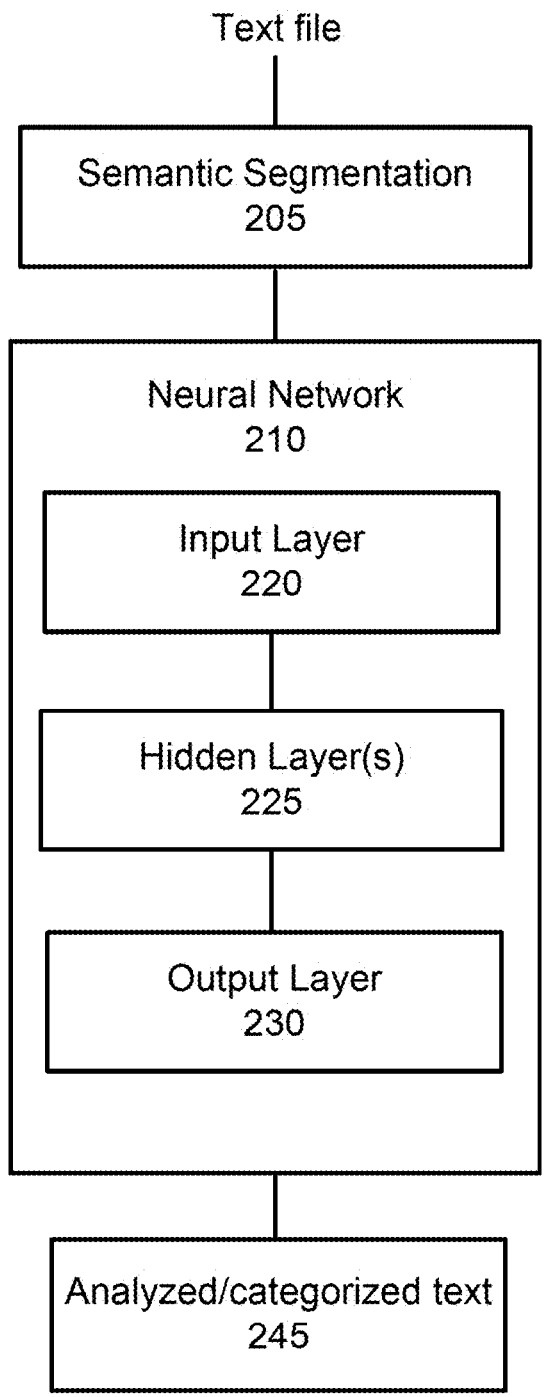
FIGS. 2A and 2B are block diagrams that illustrate use of the semantic text segmentation system with an artificial intelligence (AI) system according to embodiments of the inventive concept.
Figure 2B:
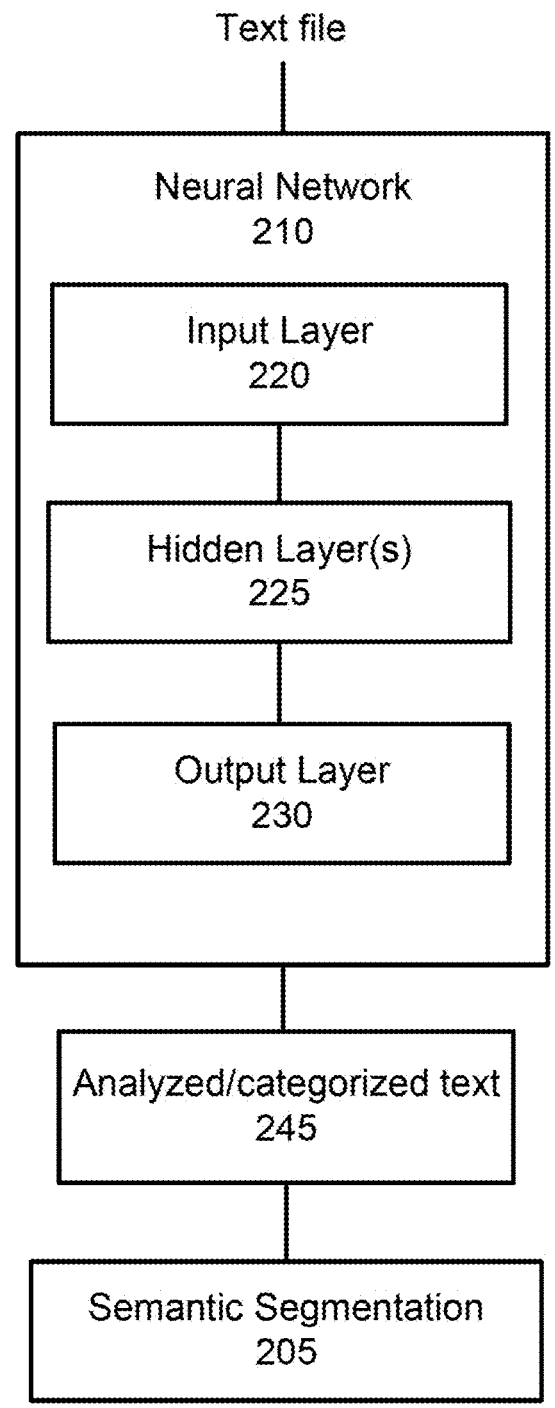

FIGS. 2A and 2B are functional block diagrams of the semantic text segmentation system for segmenting text based on a text area threshold determination of FIG. 1 comprising the AI server 140/AI engine module 145 and the segmentation server 130/semantic segmentation module 135. As shown in FIGS. 2A and 2B, the semantic text segmentation system may be used in conjunction with an AI system to process text files. In the example of FIG. 2A, the semantic segmentation module 205 may be configured to receive a binary annotation of source text image or an original annotation of a source text image, which may be converted into the binary annotation of the source text image. The semantic segmentation module 205 may be configured to generate a final annotation of the binary annotation of the source text image through contours corresponding to natural text groupings or annotations that are evaluated based on whether the text within a particular contour satisfies a surface area ratio test and/or through contours that correspond to rectangular boxes that are generated by subdividing or bisecting the source text image into two portions along a first direction or second direction, which are perpendicular to each other. The annotated segmented text output from the semantic segmentation module 205 may serve as input for use in training or for use in inference mode to an AI system, which may be embodied, for example, as a neural network 210.

Figure 3:
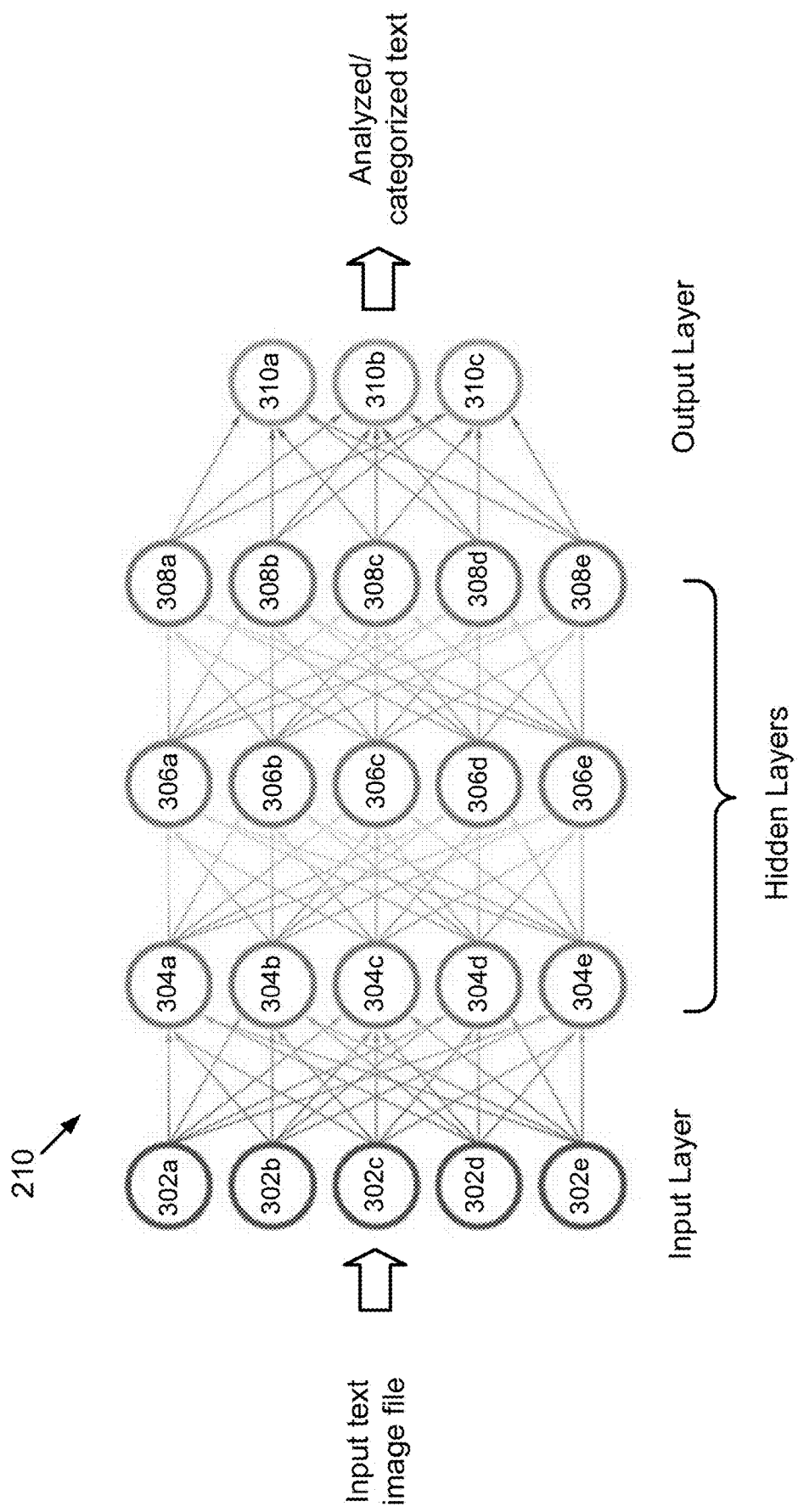
FIG. 3 is a diagram of an artificial neural network of FIGS. 2A and 2B according to some embodiments of the inventive concept.

The artificial neural network 210 may be configured to receive the annotated segmented text output from the semantic segmentation module at an input layer 220 for processing. The neural network 210 includes the input layer 220, one or more hidden layers 225, and an output layer 230. The neural network 210 is shown in more detail in FIG. 3. Referring now to FIG. 3, artificial neural networks are generally based on the same fundamental concepts. The data to be analyzed is broken into elements that can be distributed across an array of nodes, e.g., pixels for an image-recognition task or parameters for a forecasting problem. The artificial neural network 210 may consist of two or more layers of nodes, which can be connected to each other in a variety of different ways.

In a fully connected layer, every node in layer A connects to every node in layer B. In a convolutional layer, in contrast, a filter is defined that assigns a small portion of layer A to each node in layer B. In the example where layers A and B are fully or densely connected, each node in layer A sends its data element to each node in layer B. In the example of FIG. 3, each of the layers is fully or densely connected, but this is merely an example. In other embodiments, only a portion of the artificial neural network 210 layers may be fully or densely connected. Each node in layer B multiplies each of the data elements received from the layer A nodes by a respective weight that corresponds to the layer A node from which the data element was received and then sums these products for all of the nodes in layer A. Each node in layer B may then apply an activation function to the summation and forward the output on to the nodes in the next layer. The process repeats for as many layers as there are in the artificial neural network 210.

In the example of FIG. 3, the artificial neural network 210 includes a plurality of node layers comprising an input layer, one or more hidden layers, and an output layer. In the example shown in FIG. 3, an input layer comprises five nodes or neurons 302a, 302b, 302c, 302d, and 302e and an output layer comprises three nodes or neurons 310a, 310b, and 310c. In the example shown, three hidden layers connect the input layer to the output layer including a first hidden layer comprising five nodes or neurons 304a, 304b, 304c, 304d, and 304e, a second hidden layer comprising five nodes or neurons 306a, 306b, 306c, 306d, and 306e, and a third hidden layer comprising five nodes or neurons 308a, 308b, 308c, 308d, and 308e. Other embodiments may use more or fewer hidden layers. Each node or neuron connects to another and has an associated weight and threshold. If the output of any individual node or neuron is above the specified threshold value, that node is activated, sending data to the next layer of the network. Otherwise, no data is passed along to the next layer of the network.

Each individual node or neuron may be viewed as implementing a linear regression model, which is composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed, i.e., a MAC operation. In FIG. 3, node or neuron 306a, for example, receives inputs corresponding to the outputs of nodes or neurons 304a, 304b, 304c, 304d, and 304e. These inputs are multiplied by their corresponding weights and summed at node or neuron 306a. Afterward, the output is passed through an activation function (e.g., a Rectified Linear Unit (ReLU) activation function), which determines the output. If that output exceeds a given threshold, it activates the node by passing data to the next layer in the network. This results in the output of one node becoming the input of the next node. This process of passing data from one layer to the next layer is an example of a feedforward artificial neural network.

The artificial neural network 210 relies on training data to learn and improve its accuracy over time. Once the various parameters of the artificial neural network 210 are tuned and refined for accuracy, it can be used, among other applications, to analyze/categorize text at the output layer 230. The output of the AI neural network may be analyzed/categorized text 245 that may be used for a variety of purposes including identifying portions of relevant text from a larger document, searching for portions of text that include information on a topic and/or answers to one or more questions, or the like.

In the example of FIG. 2A, the semantic segmentation module 205 is configured to process the binary annotation of a source text image prior to the source text image being used as training data or input data during inference mode to the neural network 210. In other embodiments, the semantic text segmentation operations provided by the semantic segmentation module 205 may be used as post-processing of a text document that is output from an AI system, such as the neural network 210. This configuration is illustrated in FIG. 2B. The analyzed/categorized text 245 that is output from the neural network 210 may be, if necessary, converted to a binary annotation and processed using the semantic segmentation 205 as described above with respect to FIG. 2A.

Figure 4:
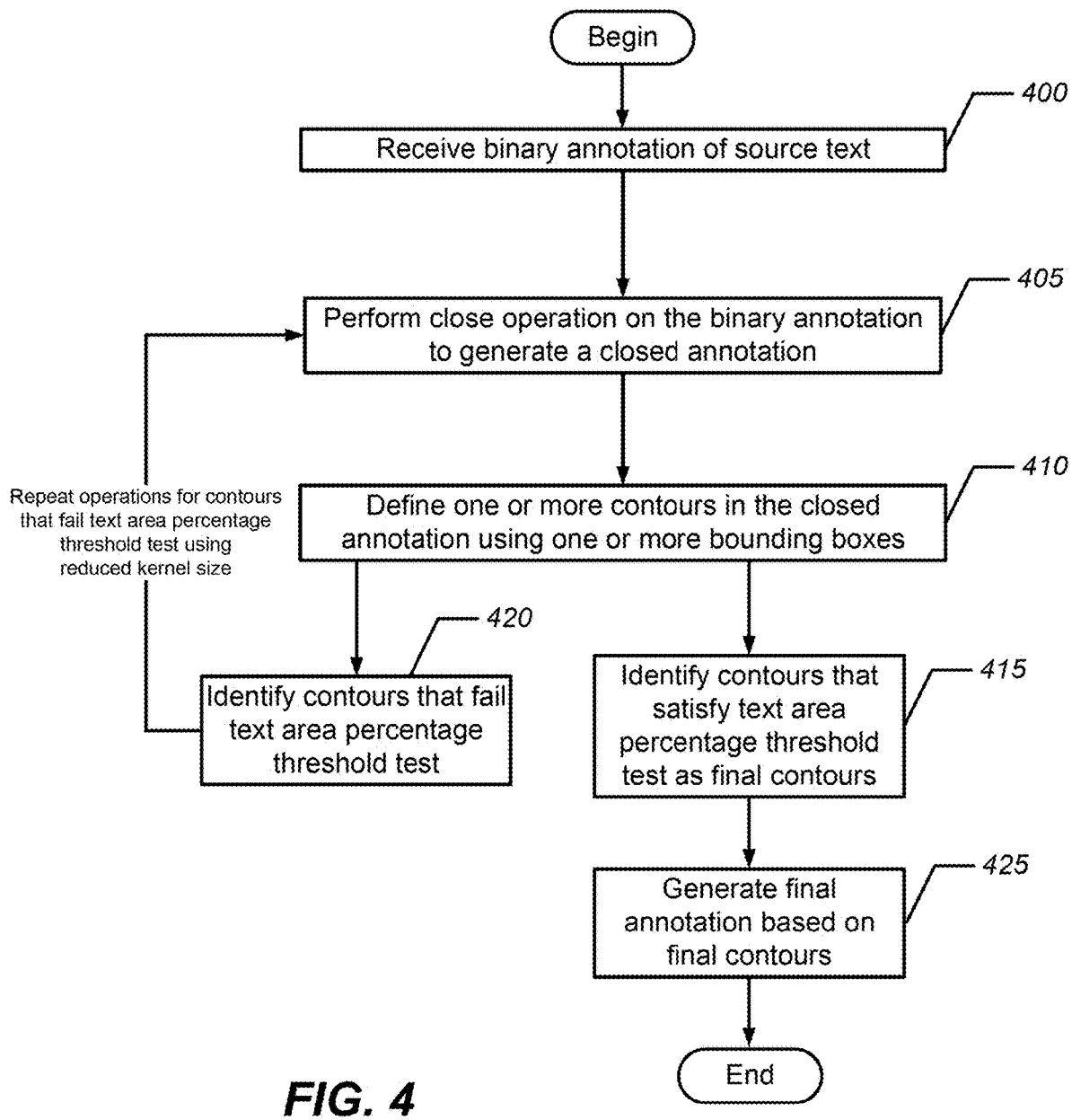
FIG. 4 is a flowchart that illustrates operations of the semantic text segmentation system for segmenting text based on a text area threshold determination according to some embodiments of the inventive concept.
Figures 6, 7:
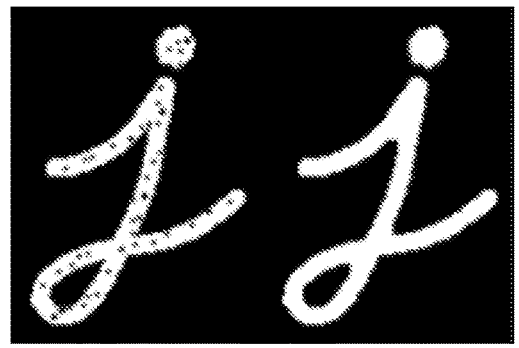
FIG. 6 is a diagram of a character that illustrates a close operation on a character according to some embodiments of the inventive concept.
FIG. 7 illustrates a contour defined in a closed annotation according to some embodiments of the inventive concept.

FIG. 4 is a flowchart that illustrates operations of the semantic text segmentation system for segmenting text based on a text area threshold determination according to some embodiments of the inventive concept. Referring now to FIG. 4, operations begin at block 400 where a binary annotation of source text image is received. As shown in FIGS. 5A and 5B, if an original annotation of source text image is received (FIG. 5A), then the original annotation of source text image can be converted to the binary annotation of source text image as shown in FIG. 5B. The binary annotation is used to support morphological operations on the source text image, e.g., close operations, as will be described below. A close operation may then be performed on the binary annotation to generate a closed annotation at block 405. A close operation may comprise a combination of a dilation operation (enlargement) with an erosion operation (shrinking). As shown in the example of FIG. 6, the close operation at block 405 uses an initial kernel size for processing the binary map and may narrow or close gaps or holes between the text annotations. In the example of FIG. 6, holes in the letter j are reduced in size or eliminated through the close operation. Annotations of words in the same paragraph or section may be merged with each other, while annotations of words from different paragraphs or sections may remain separated. The kernel size may determine the extent to which the text annotations may be expanded or shrunk.

Returning to FIG. 4, operations continue at block 410 where one or more contours are defined in the closed annotation using bounding boxes. Initially, one bounding box may be used to define the contour as the entire closed annotation. An evaluation is made whether a ratio of the text surface area within the contour to the total surface area exceeds a threshold. That is, is the percentage of surface area within the contour occupied by text greater than a defined threshold. In accordance with some embodiments of the inventive concept, the defined threshold may be about 30%. In some embodiments, the defined threshold may be in a range of about 20% to about 40%. If so, then this contour is identified as a final contour at block 415 and used to generate the final annotation at block 425. That is, the final contours represent the subset of one or more contours for which a percentage of area occupied by text within the corresponding bounding box exceeds the defined threshold. If the contour does not satisfy the text area percentage threshold test at block 420, the operations of blocks 405, 410, 415, and 420 repeat in iterative fashion with the kernel size decreasing with each iteration at block 405. Thus, if the entire closed annotation does not satisfy the text area percentage threshold test, then multiple contours may be defined at block 410 and the text area percentage threshold test may be applied to each of these contours. The contours may be defined at block 405 by dividing the closed annotation into text groupings based on distances between adjacent ones of the text groupings. FIG. 7 is an example of a contour generated due to a failure of the entire closed annotation to satisfy the text area percentage threshold test. The threshold value may be adjusted based on the shapes of the individual annotations within the closed annotation of the source text image. The iterative operations of blocks 405, 410, 415, and 420 repeat on each of the defined contours until all of the contours are identified as final contours due to passing the text area percentage threshold test or the contours cannot be shrunk any tighter to the individual annotations within the closed annotation.

When the final annotations from block 425 are merged to create a merged annotation some holes or gaps may exist. To reduce these gaps or holes, a dilation operation, according to some embodiments of the inventive concept, may be performed on the merged annotation as will be described with reference to FIG. 8. Operations begin at block 800 where for each of the final contours, the percentage of area occupied by text as applied to the original binary annotation is determined to generate a plurality of original text percentages. The final contours are merged into a merged annotation at block 805. As shown in FIG. 9A, the merged annotation may have a gap or hole therein. At block 810, for each of the final contours, the percentage of area occupied by text as applied to the merged annotation is determined to generate a plurality of merged text percentages. The merged annotation is dilated at block 815 to generate a dilated merged annotation. The dilated merged annotation is shown in FIG. 9B and illustrates the effect of the dilation operation in reducing or closing the gap or hold that was present in the merged annotation of FIG. 9A. At block 820, for each of the final contours, the percentage of area occupied by text as applied to the dilated merged annotation is determined to generate a plurality of dilated merged text percentages.

Figure 10:
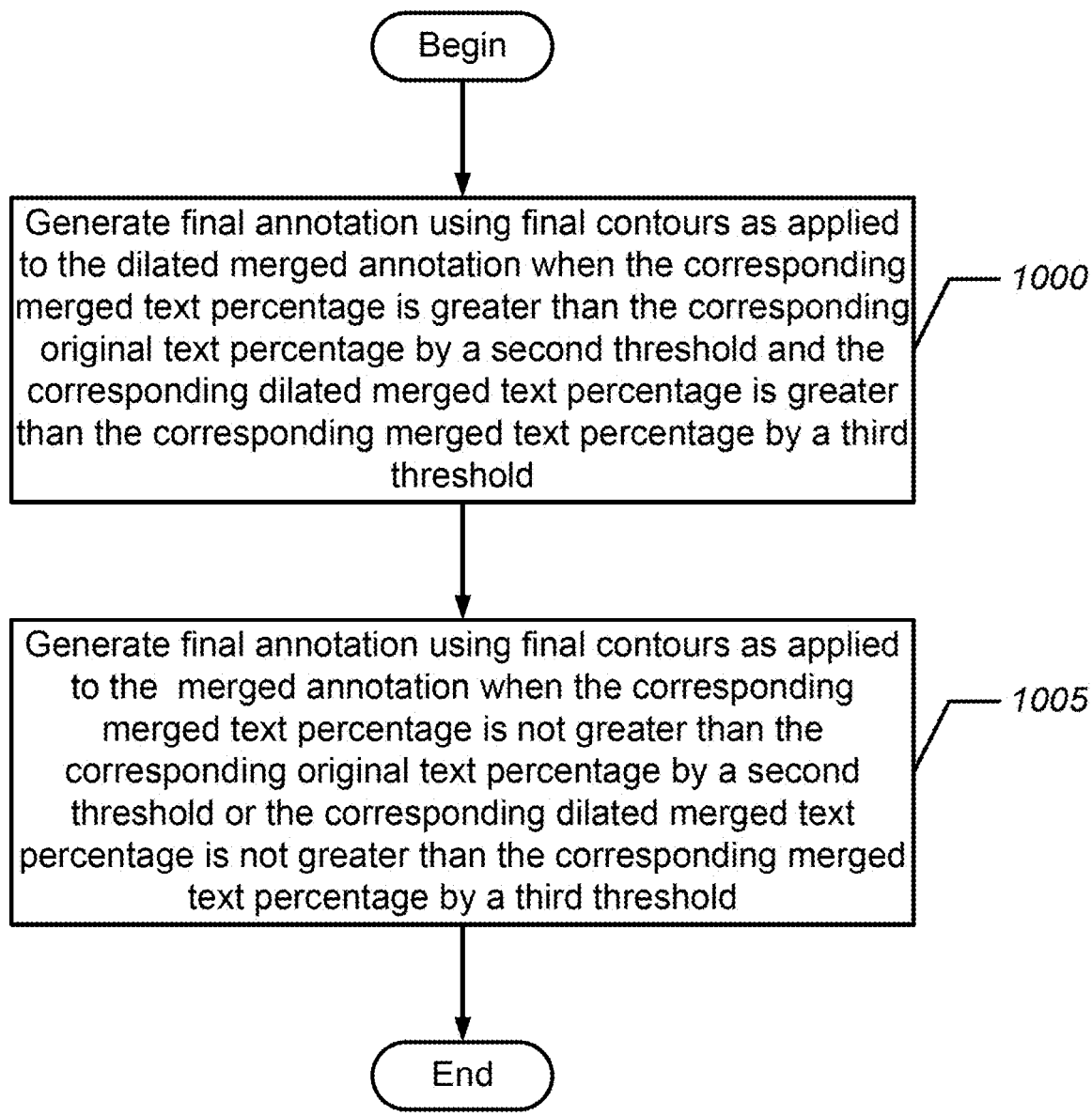
FIG. 10 is a flowchart that illustrates further operations of the semantic text segmentation system for segmenting text based on a text area threshold determination according to some embodiments of the inventive concept.
Figure 11:
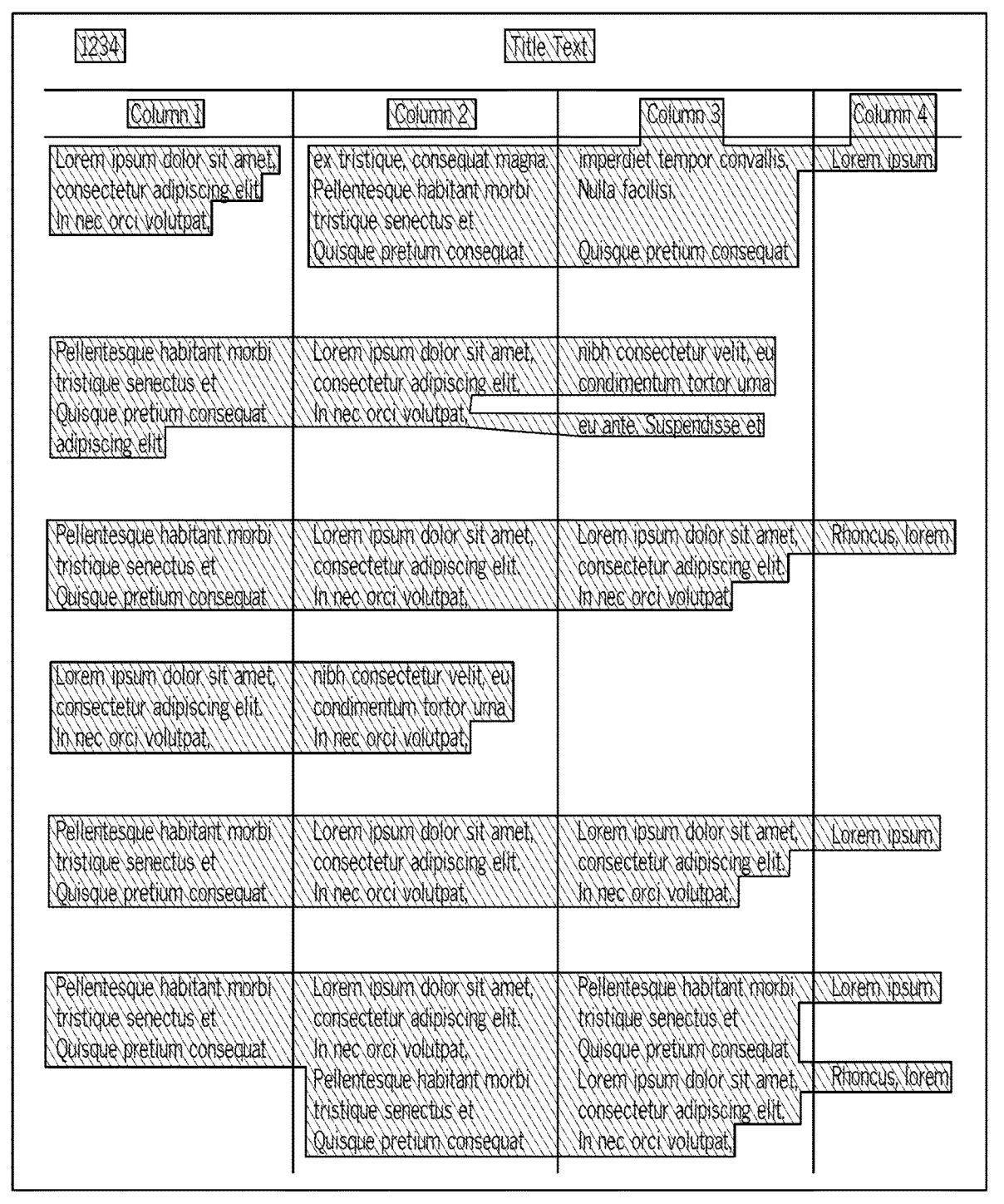

The final annotation of the source text image, which is shown in FIG. 11, may be generated by selecting individual final contours from either the dilated merged annotation or the merged annotation. Referring now to FIG. 10, the final annotation for the source text image may be generated by using the final contours as applied to the dilated merged annotation when the corresponding merged text percentage is greater than the corresponding original text percentage by a second threshold and the corresponding dilated merged text percentage is greater than the corresponding merged text percentage by a third threshold at block 1000. The final annotation for the source text image may be generated by using the final contours as applied to the merged annotation when the corresponding merged text percentage is not greater than the corresponding original text percentage by a second threshold or the corresponding dilated merged text percentage is not greater than the corresponding merged text percentage by a third threshold at block 1005. In some embodiments, the second threshold may be set to be at least 5%, i.e., the merged text percentage is greater than the corresponding original text percentage by at least 5% and the third threshold may be set to be at least about 5%, i.e., the corresponding dilated merged text percentage is not greater than the corresponding merged text percentage by at least 5%. In further embodiments, the third threshold may be set to a value where the final contours as applied to the dilated merged annotation are used in the final annotation when the merged text percentage is not significantly less than the dilated merged text percentage and the merged text percentage is greater than the corresponding original text percentage by the second threshold. Thus, the final annotation of the source text image shown in FIG. 11 may include final contours from one of or both of the dilated merged annotation and the merged annotation.

Figure 12:
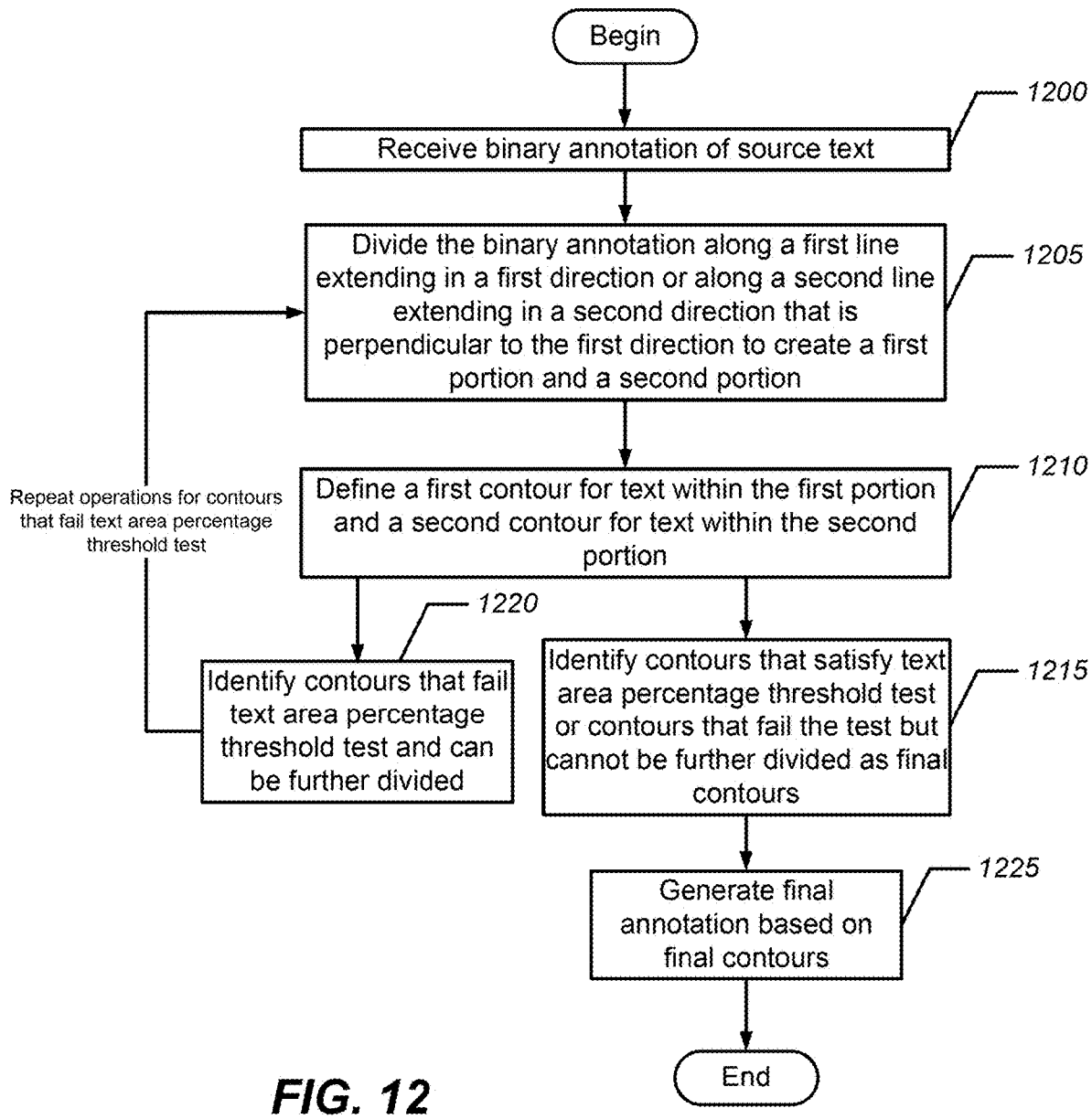
FIG. 12 is a flowchart that illustrates further operations of the semantic text segmentation system for segmenting text based on a text area threshold determination according to some embodiments of the inventive concept.

Further embodiments of the inventive concept may provide text segmentation systems and methods that are based on annotating the source text image through contours that correspond to rectangular boxes that are generated by subdividing or bisecting the source text image into two portions along a first direction or second direction, which are perpendicular to each other. Referring now to FIG. 12, operations begin at block 1200 where a binary annotation of source text image is received. As shown in FIGS. 5A and 5B, if an original annotation of source text image is received (FIG. 5A), then the original annotation of source text image can be converted to the binary annotation of source text image as shown in FIG. 5B. If the binary annotation satisfies a text area percentage threshold test, then a final annotation may be generated as the original binary annotation. Otherwise, the binary annotation may be divided along a first line extending in a first direction or along a second line extending in a second direction that is perpendicular to the first direction to create a first portion and a second portion at block 1205. Rectangular bounding boxes are used to define a first contour for text within the first portion and a second contour for text within the second portion at block 1210. This division may be performed based on the distance between the text in a first text grouping corresponding to the first contour and the text in a second text grouping corresponding to the second contour in a direction perpendicular to the line forming the division. A determination is made at blocks 1215 and 1220 whether the contours satisfy the text area percentage threshold test. In accordance with various embodiments of the inventive concept, the threshold may be defined to be about 40%, but may vary, for example in other embodiments between a range of about 30% to about 60%. If so, then the contour is identified as a final contour for use in generating the final annotation at block 1225 (i.e., the final contour(s) are a subset of the first contour and the second contour for which a percentage area occupied by text within the first or second bounding box exceeds the defined threshold). The contours that fail the text area percentage threshold test are further processed in iterative fashion by repeating the operations of blocks 1205, 1210, 1215, and 1220 on these individual contours. These operations continue until all of the contours are identified as final contours due to passing the text area percentage threshold test or the contours cannot be subdivided further.

FIGS. 13A-13F illustrate the operations of blocks 1205, 1210, 1215, and 1220 where a binary source text image shown in FIG. 13A is initially divided horizontally into two contours (FIG. 13B), then each of these contours fail the text area percentage threshold test so these contours are each further divided horizontally as shown in FIG. 13C. Two of the four contours of FIG. 13C pass the text area percentage threshold test and two do not pass the text area percentage threshold test, which results in the two failing contours to be split as shown in FIG. 13D. This process continues for another iteration as shown in FIG. 13E until all of the contours satisfy the text area percentage threshold test and are then used to generate the final annotation as shown in FIG. 13F.

Figure 8:
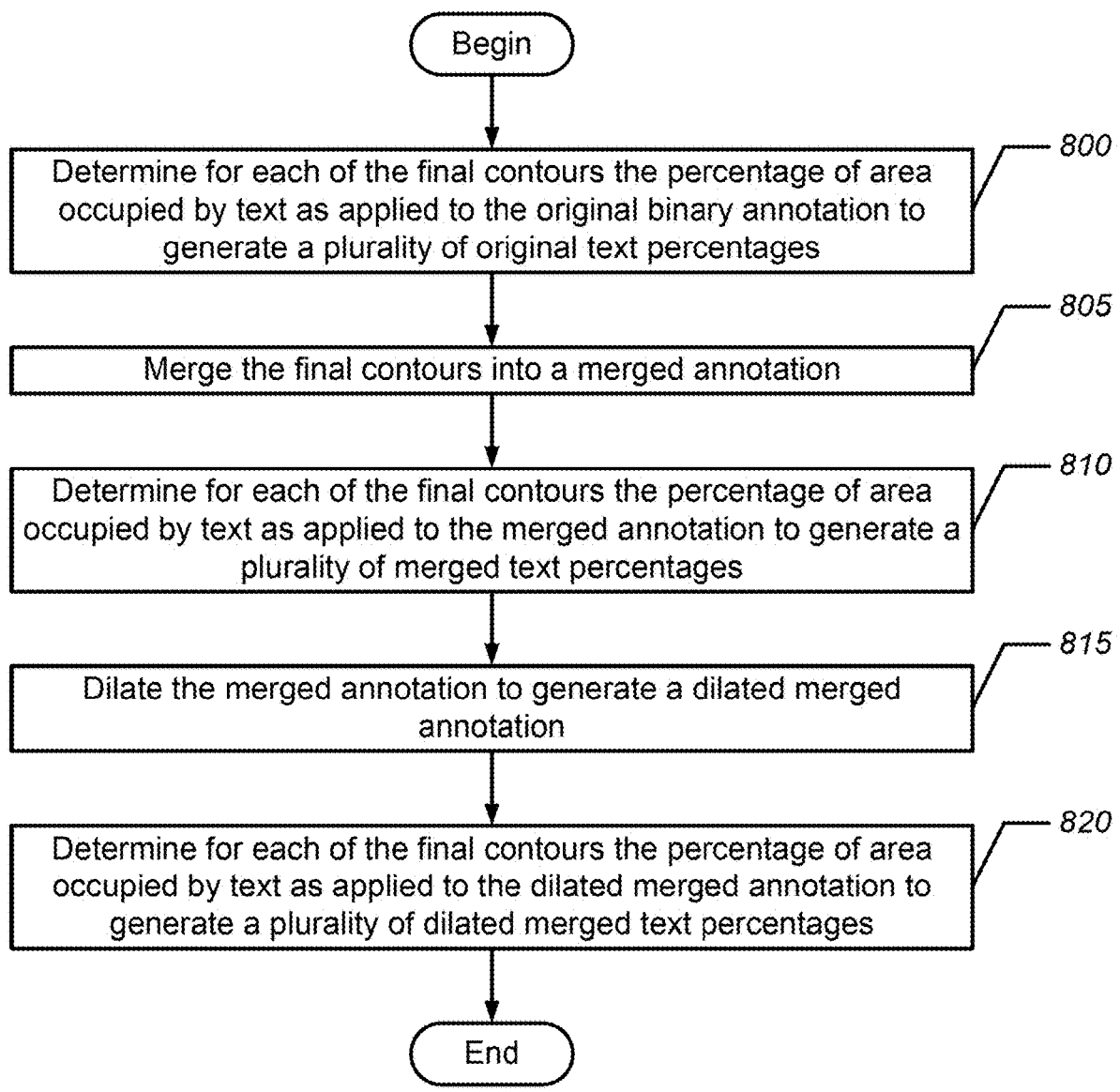
FIG. 8 is a flowchart that illustrates further operations of the semantic text segmentation system for segmenting text based on a text area threshold determination according to some embodiments of the inventive concept.
Figure 14A:
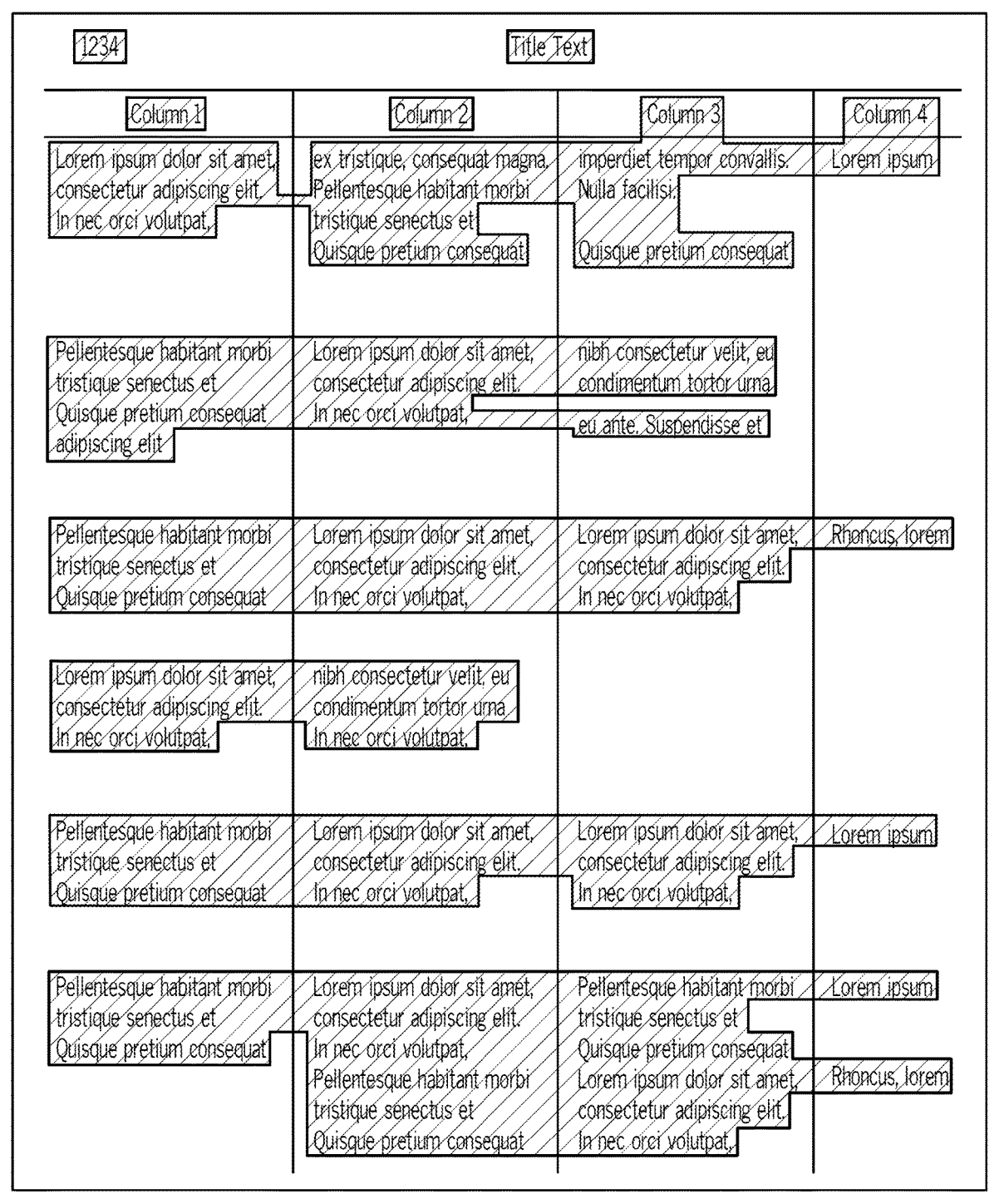
Figure 14B:
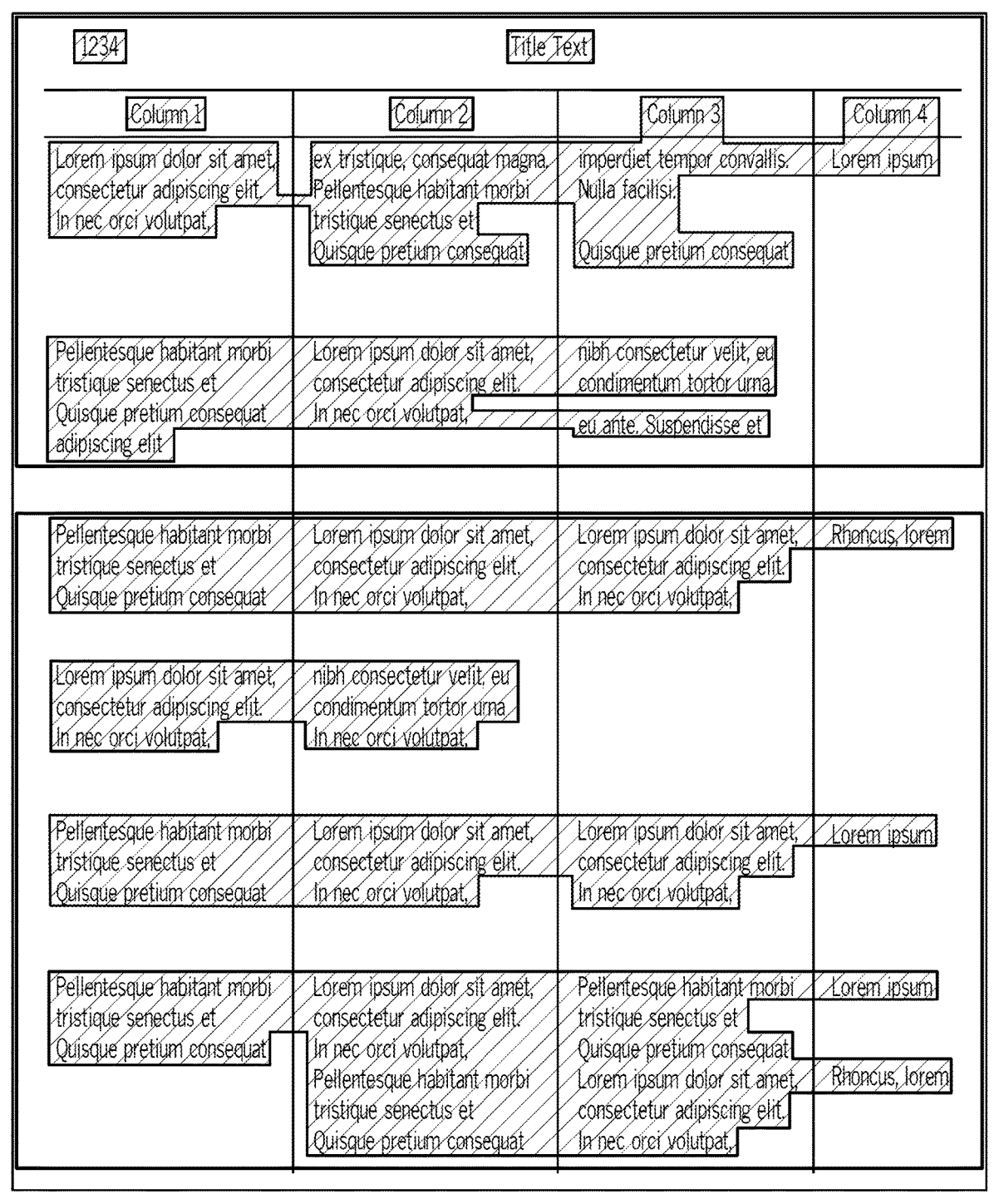

The embodiments of FIG. 4 and FIG. 12 may be combined such that the text segmentation based on bisecting the source text image along either of two perpendicular directions can be applied to the final annotation output using the operations of FIGS. 4, 8, and 10 to further annotate the text therewithin. Such embodiments are illustrated, for example, in FIGS. 14A-14C. FIG. 14A illustrates a final annotation that is generated using the operations of FIGS. 4, 8, and 10 as described above by performing the morphological operations of closing the annotations corresponding to individual contours, using bounding boxes to create new contours therefrom, and evaluating these contours to determine whether they satisfy a text area percentage threshold test. This final annotation may then be processed using the operations described above with respect to FIGS. 12 and 13A-13F by bisecting the final annotation in one of two perpendicular directions and applying the text area percentage threshold test to the two contours created by the bisection as represented by FIG. 14B. This process may continue for multiple iterations as described above with respect to FIG. 12 until a final annotation is generated as shown in FIG. 14C.

Figure 15:
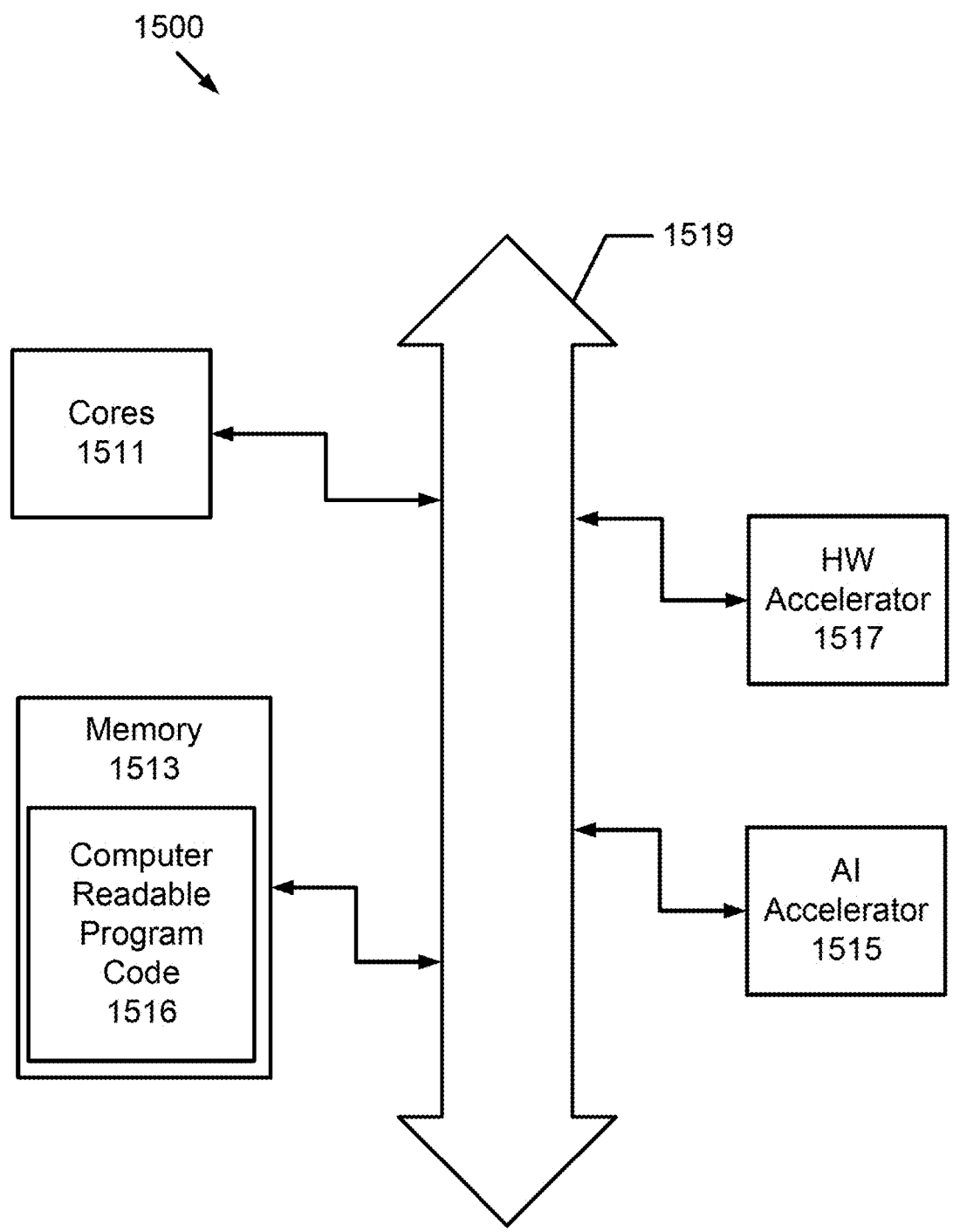
FIG. 15 is a data processing system that may be used to implement one or more servers in the semantic text segmentation system of FIG. 1 in accordance with some embodiments of the inventive concept.

FIG. 15 is a block diagram of a data processing system 1500 that may be used to implement the semantic text segmentation system of FIG. 1 in accordance with some embodiments of the inventive concept. As shown in FIG. 15, the data processing system 1500 may include at least one core 1511, a memory 1513, an AI accelerator 1515, and a hardware (HW) accelerator 1517. The at least one core 1511, the memory 1513, the AI accelerator 1515, and the HW accelerator 1517 may communicate with each other through a bus 1519.

The at least one core 1511 may be configured to execute computer program instructions. For example, the at least one core 1511 may execute an operating system and/or applications represented by the computer readable program code 1516 stored in the memory 1513. In some embodiments, the at least one core 1511 may be configured to instruct the AI accelerator 1515 and/or the HW accelerator 1517 to perform operations by executing the instructions and obtain results of the operations from the AI accelerator 1515 and/or the HW accelerator 1517. In some embodiments, the at least one core 1511 may be an ASIP customized for specific purposes and support a dedicated instruction set.

The memory 1513 may have an arbitrary structure configured to store data. For example, the memory 1513 may include a volatile memory device, such as dynamic random-access memory (DRAM) and static RAM (SRAM), or include a non-volatile memory device, such as flash memory and resistive RAM (RRAM). The at least one core 1511, the AI accelerator 1515, and the HW accelerator 1517 may store data in the memory 1513 or read data from the memory 1513 through the bus 1519.

The AI accelerator 1515 may refer to hardware designed for AI applications, such as performing morphological operations and text segmentation on text images in accordance with embodiments described herein. The AI accelerator 1515 may generate output data by processing input data provided from the at least one core 1511 and/or the HW accelerator 1517 and provide the output data to the at least one core 1511 and/or the HW accelerator 1517. In some embodiments, the AI accelerator 1515 may be programmable and be programmed by the at least one core 1511 and/or the HW accelerator 1517. The HW accelerator 1517 may include hardware designed to perform specific operations at high speed. The HW accelerator 1517 may be programmable and be programmed by the at least one core 1511.

Figure 16:
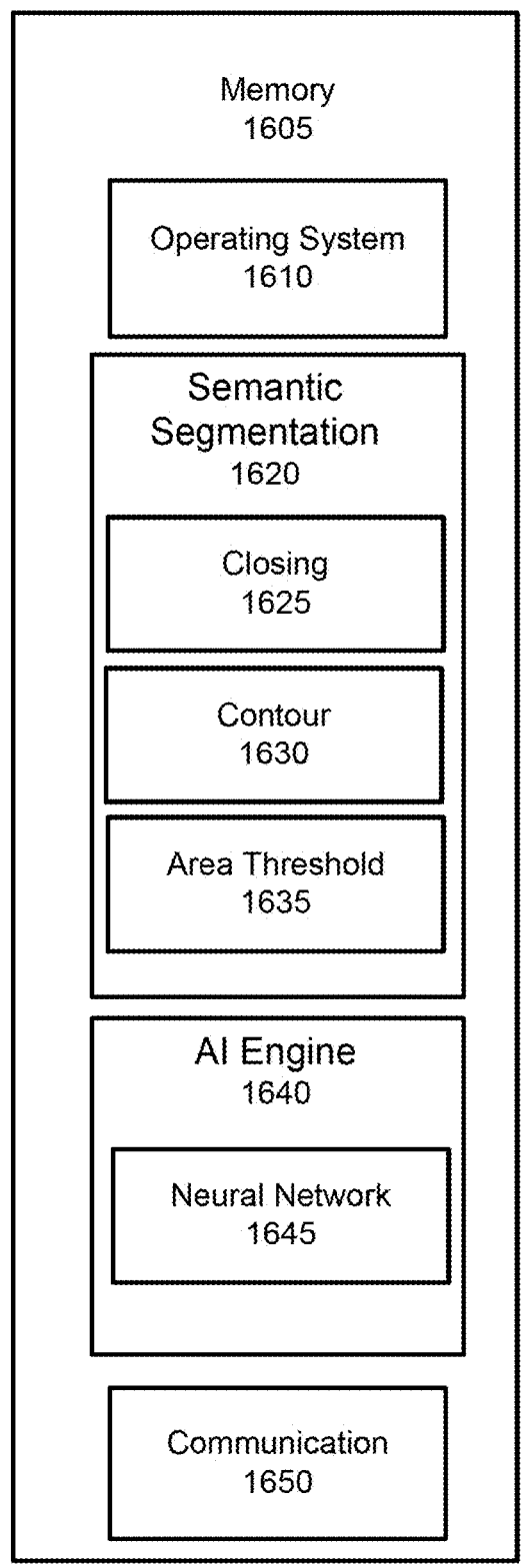
FIG. 16 is a block diagram that illustrates a software/hardware architecture for use in the semantic text segmentation system of FIG. 1 in accordance with some embodiments of the inventive concept.

FIG. 16 illustrates a memory 1605 that may be used in embodiments of data processing systems, such as the semantic text segmentation system of FIG. 1 and the data processing system 1500 of FIG. 15, respectively, to facilitate operation of the AI server 140/AI engine module 145 and the segmentation server 130/semantic segmentation module 135 according to some embodiments of the inventive concept. The memory 1605 is representative of the one or more memory devices containing the software and data used for facilitating operations of the semantic text segmentation system of FIG. 1 as described herein. The memory 1605 may include, but is not limited to, the following types of devices: cache, ROM, PROM, EPROM, EEPROM, flash, SRAM, and DRAM. As shown in FIG. 16 the memory 1605 may contain three or more categories of software and/or data: an operating system 1610, a semantic segmentation module 1620, an AI engine module 1640, and a communication module 1650. In particular, the operating system 1610 may manage the data processing system's software and/or hardware resources and may coordinate execution of programs by the processor.

The semantic segmentation module 1620 may be configured to implement the semantic segmentation module 135 of FIG. 1 and may include a closing module 1625, a contour module 1630, and an area threshold module 1635. The closing module 1625 may be configured to perform one or more of the operations of the flowcharts of FIGS. 4, 8, and 10 including, for example, block 405 of FIG. 4 and block 815 of FIG. 8. The contour module 1630 may be configured to perform one or more of the operations of the flowcharts of FIGS. 4, 8, 10, and 12 including, for example, blocks 410, 415, 420 of FIG. 4, block 805 of FIG. 8, blocks 1000 and 1005 of FIG. 10, and blocks 1205, 1210, 1215, and 1220 of FIG. 12. The area threshold module 1635 may be configured to perform one or more of the operations of FIGS. 4, 8, 10, and 12 including, for example, blocks 415 and 420 of FIG. 4, blocks 800, 810, and 820 of FIG. 8, blocks 1000 and 1005 of FIG. 10, and blocks 1215 and 1220 of FIG. 12.

The AI engine 1640 may be configured to implement the AI engine module 145 and may include an artificial neural network module 1645, which may be configured to perform one or more operations described above with respect to the neural network 210 of FIGS. 2A, 2B, and 3. The communication module 1650 may be configured to facilitate communication between the segmentation server 130 and the AI server 140 and between the segmentation server 130 and/or the AI server 140 and the user devices 110*a*, 110*b*, and 110*c*, for example.

Although FIGS. 15 and 16 illustrate hardware/software architectures that may be used in data processing systems, such as the semantic text segmentation system of FIG. 1 and the data processing system 1500 of FIG. 15 in accordance with some embodiments of the inventive concept, it will be understood that embodiments of the present inventive concept are not limited to such a configuration but is intended to encompass any configuration capable of carrying out operations described herein.

Computer program code for carrying out operations of data processing systems described above with respect to FIGS. 1-16 may be written in a high-level programming language, such as Python, Java, C, and/or C++, for development convenience. In addition, computer program code for carrying out operations of the present invention may also be written in other programming languages, such as, but not limited to, interpreted languages. Some components or routines may be written in assembly language or even microcode to enhance performance and/or memory usage. It will be further appreciated that the functionality of any or all of the program components may also be implemented using discrete hardware components, one or more application specific integrated circuits (ASICs), or a programmed digital signal processor or microcontroller.

Moreover, the functionality of the semantic text segmentation system of FIG. 1 and the data processing system 1500 of FIG. 15 may each be implemented as a single processor system, a multi-processor system, a multi-core processor system, or even a network of stand-alone computer systems, in accordance with various embodiments of the inventive concept. Each of these processor/computer systems may be referred to as a "processor" or "data processing system."

The data processing apparatus described herein with respect to FIGS. 1-16 may be used to facilitate operations of segmenting text into annotations based on text area threshold determinations according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 1513 when coupled to a processor includes computer readable program code that, when executed by the processor, causes the processor to perform operations including one or more of the operations described herein with respect to FIGS. 1-14A, 14B, and 14C.

Some embodiments of the inventive concept may provide text segmentation systems and methods that are based on annotating the source text image through contours corresponding to natural text groupings or annotations that are evaluated based on whether the text within a particular contour satisfies a surface area ratio test. Some further embodiments of the inventive concept may provide text segmentation systems and methods that are based on annotating the source text image through contours that correspond to rectangular boxes that are generated by subdividing or bisecting the source text image into two portions along a first direction or second direction, which are perpendicular to each other. These text segmentation systems and methods may facilitate the grouping of paragraphs or sections of text together as opposed to just distinguishing between different types of text or identifying image edges. Disjoint text annotations can be grouped with contours being generated that are either based on morphed boundaries from the original text and/or bounding boxes that satisfy a text surface area ratio threshold. Moreover, the text segmentation systems and methods may include morphological operations that are integrated into the segmentation process, which may obviate the need for a separate system or network for grouping various text annotations into a final annotation.

Further Definitions and Embodiments

In the above description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described to best explain the principles of the inventive concept and the practical application, and to enable others of ordinary skill in the art to understand the inventive concept with various modifications as are suited to the particular use contemplated.

What is claimed is:

1. A method, comprising:
   receiving a binary annotation of source text;
   performing a close operation on the binary annotation to generate a closed annotation using an initial kernel size;
   defining one or more contours in the closed annotation using one or more bounding boxes, respectively;
   determining a subset of the one or more contours for which a percentage of area occupied by text within a corresponding bounding box exceeds a threshold;
   generating a final annotation of the source text based on the subset of the one or more contours; and
   performing operations of performing the close operation, defining the one or more contours, and determining the subset of the one or more contours in iterative fashion for respective ones of the subset of the one or more contours until all of the one or more contours are included in the subset of the one or more contours.

2. The method of claim 1, wherein receiving the binary annotation of source text comprises:
   receiving an original annotation of source text; and
   converting the original annotation of source text to the binary annotation of source text.

3. The method of claim 1, further comprising:
   reducing the initial kernel size with each successive iteration.

4. The method of claim 1, further comprising:
   determining, for the respective ones of the subset of the one or more contours, a percentage of area occupied by text within the corresponding bounding box as applied to the binary annotation to generate a plurality of original text percentages;
   merging the subset of the one or more contours into a merged annotation;
   determining, for the respective ones of the subset of the one or more contours, a percentage of area occupied by text within the corresponding bounding box as applied to the merged annotation to generate a plurality of merged text percentages;
   dilating the merged annotation to generate a dilated merged annotation; and
   determining, for the respective ones of the subset of the one or more contours, a percentage of area occupied by text within the corresponding bounding box as applied to the dilated merged annotation to generate a plurality of dilated merged text percentages.

5. The method of claim 4, wherein the threshold is a first threshold; and
   wherein generating the final annotation comprises:
   generating the final annotation using the respective ones of the subset of the one or more contours as applied to the dilated merged annotation when the corresponding merged text percentage is greater than the corresponding original text percentage by a second threshold and the corresponding dilated merged text percentage is greater than the corresponding merged text percentage by a third threshold; and
   generating the final annotation using the respective ones of the subset of the one or more contours as applied to the merged annotation when the corresponding merged text percentage is not greater than the corresponding original text percentage by the second threshold or the corresponding dilated merged text percentage is not greater than the corresponding merged text percentage by the third threshold.

6. The method of claim 5, wherein generating the final annotation further comprises:
   dividing the final annotation along a first line extending in a first direction or along a second line extending in a second direction that is perpendicular to the first direction to create a first portion and a second portion;
   defining a first contour using a first rectangular bounding box for text within the first portion and a second contour using a second rectangular bounding box for text within the second portion; and
   determining, for each of the first contour and the second contour, whether a percentage of area occupied by text within the corresponding first or second rectangular bounding box exceeds a fourth threshold, the subset of the one or more contours comprising respective ones of the first contour and the second contour having the percentage of area occupied by text within the corresponding bounding box exceeding the fourth threshold.

7. The method of claim 1, wherein performing the close operation comprises:

performing a dilation on the binary annotation to generate a dilated binary annotation; and performing an erosion on the dilated binary annotation to generate the closed annotation.

8. The method of claim 1, wherein defining the one or more contours in the closed annotation using one or more bounding boxes, respectively, comprises:

dividing the closed annotation into text groupings based on distances between adjacent ones of the text groupings; and wherein the text groupings correspond to the one or more contours.

9. A method, comprising:

receiving a binary annotation of source text;

dividing the binary annotation along a first line extending in a first direction or along a second line extending in a second direction that is perpendicular to the first direction to create a first portion and a second portion, wherein dividing the binary annotation comprises dividing the binary annotation into a first text grouping and a second text grouping based on a distance in the first direction or the second direction between the first text grouping and the second text grouping;

defining a first contour using a first bounding box for text within the first portion and a second contour using a second bounding box for text within the second portion;

determining a subset of the first contour and the second contour for which a percentage area occupied by text within the first or second bounding box exceeds a threshold;

generating a final annotation of the source text based on the subset of the first contour and the second contour; and performing operations of dividing the binary annotation, defining the first contour and the second contour, and determining the subset of the first contour and the second contour, in iterative fashion for respective ones of the first contour and the second contour for which the percentage of area occupied by text within the corresponding bounding box does not exceed the threshold until all of the first contour and the second contour are determined to be in the subset of the first contour and the second contour or are determined to not have the first text grouping and the second text grouping therewithin that exceeds the distance threshold.

10. The method of claim 9, wherein the first text grouping and the second text grouping respectively correspond to the first contour and the second contour.

11. The method of claim 10, wherein dividing the binary annotation into the first text grouping and the second text grouping comprises:

dividing the binary annotation into the first text grouping and the second text grouping when the distance in the first direction or the second direction between the first text grouping and the second text grouping exceeds a distance threshold.

12. The method of claim 11, wherein generating the final annotation comprises:

generating the final annotation using respective ones of the subset of the first contour and the second contour and the respective ones of the first contour and second contour for which the distance between the first text grouping and the second text grouping therewithin does not exceed the distance threshold.

13. A system, comprising:

a processor; and a memory coupled to the processor and comprising computer readable program code embodied in the memory that is executable by the processor to perform operations comprising:

receiving a binary annotation of source text;

performing a close operation on the binary annotation to generate a closed annotation using an initial kernel size;

defining one or more contours in the closed annotation using one or more bounding boxes, respectively;

determining a subset of the one or more contours for which a percentage of area occupied by text within a corresponding bounding box exceeds a threshold;

generating a final annotation of the source text based on the subset of the one or more contours; and performing operations of performing the close operation, defining the one or more contours, and determining the subset of the one or more contours in iterative fashion for respective ones of the subset of the one or more contours until all of the one or more contours are included in the subset of the one or more contours.

14. The system of claim 13, wherein the operations further comprise:

reducing the initial kernel size with each successive iteration.

15. The system of claim 13, wherein the operations further comprise:

determining, for the respective ones of the subset of the one or more contours, a percentage of area occupied by text within the corresponding bounding box as applied to the binary annotation to generate a plurality of original text percentages;

merging the subset of the one or more contours into a merged annotation;

determining, for the respective ones of the subset of the one or more contours, a percentage of area occupied by text within the corresponding bounding box as applied to the merged annotation to generate a plurality of merged text percentages;

dilating the merged annotation to generate a dilated merged annotation; and determining, for the respective ones of the subset of the one or more contours, a percentage of area occupied by text within the corresponding bounding box as applied to the dilated merged annotation to generate a plurality of dilated merged text percentages.

16. The system of claim 15, wherein the threshold is a first threshold; and wherein generating the final annotation comprises:

generating the final annotation using the respective ones of the subset of the one or more contours as applied to the dilated merged annotation when the corresponding merged text percentage is greater than the corresponding original text percentage by a second threshold and the corresponding dilated merged text percentage is greater than the corresponding merged text percentage by a third threshold; and generating the final annotation using the respective ones of the subset of the one or more contours as applied to the merged annotation when the corresponding merged text percentage is not greater than the corresponding original text percentage by the second threshold or the corresponding dilated merged text percentage is not greater than the corresponding merged text percentage by the third threshold.

17. The system of claim 13, wherein performing the close operation comprises:

performing a dilation on the binary annotation to generate a dilated binary annotation; and performing an erosion on the dilated binary annotation to generate the closed annotation.

\* \* \* \* \*